(12) United States Patent
Yamamoto

(10) Patent No.: US 10,412,270 B2
(45) Date of Patent: Sep. 10, 2019

(54) INK AMOUNT UPPER LIMIT SETTING METHOD AND NON-TRANSITORY COMPUTER READABLE MEDIUM FOR STORING PROGRAM OF INK AMOUNT UPPER LIMIT SETTING METHOD

(71) Applicant: SEIKO EPSON CORPORATION, Tokyo (JP)

(72) Inventor: Yuko Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/661,069

(22) Filed: Jul. 27, 2017

(65) Prior Publication Data

US 2018/0041663 A1 Feb. 8, 2018

(30) Foreign Application Priority Data

Aug. 8, 2016 (JP) .................................. 2016-155400

(51) Int. Cl.
*H04N 1/60* (2006.01)
*B41J 2/21* (2006.01)
(Continued)

(52) U.S. Cl.
CPC ............ *H04N 1/605* (2013.01); *B41J 2/2103* (2013.01); *B41J 29/38* (2013.01); *G06K 15/102* (2013.01); *H04N 1/6008* (2013.01); *H04N 1/6019* (2013.01); *H04N 1/6044* (2013.01); *H04N 1/6075* (2013.01); *G06K 2215/0094* (2013.01); *G06K 2215/101* (2013.01); *H04N 2201/0094* (2013.01)

(58) Field of Classification Search
CPC combination set(s) only.
See application file for complete search history.

(56) References Cited

U.S. PATENT DOCUMENTS 7,407,242 B2 * 8/2008 Piatt ...................... B41J 2/2107
347/2
7,889,403 B2 * 2/2011 Kuhn ................... H04N 1/6055
345/600

(Continued)

FOREIGN PATENT DOCUMENTS

DE     10 2016 205 779 A1    6/2016
JP        2012-066426 A       4/2012
(Continued)

OTHER PUBLICATIONS

The Extended European Search Report for the corresponding European Patent Application No. 17184908.6 dated Dec. 11, 2017.

*Primary Examiner* — Barbara D Reinier

(57) ABSTRACT

An ink amount upper limit setting apparatus includes a target color designating section that accepts the designation of at least one target color for which an ink amount upper limit is to be set. A patch controller causes an output device to form patches in accordance with output values. A colorimetric value acquiring section acquires colorimetric values of the formed patches. A color reproduction determination output section outputs color reproduction determination information that indicates whether the target color is contained in a color reproduction region for each of ink amount upper limit candidates, on the basis of a coordinate value of the target color and the colorimetric values.

8 Claims, 16 Drawing Sheets

(51) Int. Cl.
*G06K 15/10* (2006.01)
*B41J 29/38* (2006.01)

(56) References Cited

U.S. PATENT DOCUMENTS

| | | | |
|---|---|---|---|
| 2013/0194327 | A1 | 8/2013 | Hara et al. |
| 2015/0242724 | A1 | 8/2015 | Nishizaki |
| 2018/0222218 | A1 | 8/2018 | Okumura |
| 2018/0264841 | A1* | 9/2018 | Hayashi ................ B41J 2/2146 |

FOREIGN PATENT DOCUMENTS

| | | |
|---|---|---|
| JP | 2018-126993 A | 8/2018 |
| JP | 2018-129601 A | 8/2018 |

* cited by examiner

| PRINT SETTING 1 | INK AMOUNT UPPER LIMIT CANDIDATE GROUP 1 |
|---|---|
| PRINT SETTING 2 | INK AMOUNT UPPER LIMIT CANDIDATE GROUP 2 |
| PRINT SETTING 3 | INK AMOUNT UPPER LIMIT CANDIDATE GROUP 3 |
| ⋮ | ⋮ |

114

| INK AMOUNT UPPER LIMIT CANDIDATE GROUP | | | |
|---|---|---|---|
| | PRIMARY COLOR | SECONDARY COLOR | TOTAL |
| CANDIDATE 1 | 60% | 80% | 80% |
| CANDIDATE 2 | 80% | 100% | 100% |
| CANDIDATE 3 | 100% | 120% | 120% |
| ⋮ | ⋮ | ⋮ | ⋮ |

| | DETERMINATION RESULT | PRIMARY COLOR | SECONDARY COLOR | TOTAL | |
|---|---|---|---|---|---|
| RECOMMENDATION | CANDIDATE 2 | INSIDE GAMUT | 80% | 100% | 100% | ←612 |
| | CANDIDATE 3 | INSIDE GAMUT | 100% | 120% | 120% | ←613 |
| | CANDIDATE 1 | OUTSIDE GAMUT | 60% | 80% | 80% | ←611 |
| | ⋮ | ⋮ | ⋮ | ⋮ | ⋮ | |

FIG. 14B

| | DETERMINATION RESULT | PRIMARY COLOR | SECONDARY COLOR | TOTAL | |
|---|---|---|---|---|---|
| RECOMMENDATION | CANDIDATE 2 | INSIDE GAMUT | 80% | 100% | 100% | ←612 |

DISPLAY NEXT CANDIDATE

FIG. 15A

| | DETERMINATION RESULT | PRIMARY COLOR | SECONDARY COLOR | TOTAL |
|---|---|---|---|---|
| CANDIDATE 1 | OUTSIDE GAMUT | 60% | 80% | 80% |

NEXT CANDIDATE

| | | | | |
|---|---|---|---|---|
| CANDIDATE 2 | NOT DETERMINED | 80% | 100% | 100% |

FIG. 15B

| | DETERMINATION RESULT | PRIMARY COLOR | SECONDARY COLOR | TOTAL |
|---|---|---|---|---|
| CANDIDATE 2 | INSIDE GAMUT | 80% | 100% | 100% |

INK AMOUNT UPPER LIMIT SETTING METHOD AND NON-TRANSITORY COMPUTER READABLE MEDIUM FOR STORING PROGRAM OF INK AMOUNT UPPER LIMIT SETTING METHOD

BACKGROUND

1. Technical Field

The present invention relates to a technique for setting an ink amount upper limit, and more specifically to a technique for setting an upper limit of the amount per unit area of ink which an ink jet printer is permitted to discharge.

2. Related Art

In order to form ink dots over a print substrate, an exemplary ink jet printer discharges liquid ink droplets from its nozzles onto the print substrate. In this case, if the liquid ink droplets are placed on the print substrate at excessively high density, bleeding of the ink dots or wrinkles of the print substrate may be noticeable. In general, the density of the ink droplets tends to increase, especially when the ink jet printer performs color printing, because C (cyan), M (magenta), Y (yellow) ink dots may be mixed with one another. Thus, one known type of ink jet printer controls the amount of ink discharged onto a print substrate by using an LUT (lookup table), such as a color conversion or color separation LUT, which is used to convert input values that indicate the amounts of R, G, and B colors into output values that indicate the used amounts of different types of inks. With this control, the discharged amount of the ink does not exceed an ink ejection amount limit, which is an upper limit of the amount per unit area of the ink which the ink jet printer is permitted to discharge. Herein, the discharged amount of ink may also be referred to as the ink duty, and the ink ejection amount limit may also be referred to below as the ink duty limit.

The ink ejection amount limit is determined so as to suppress the bleeding of ink dots and wrinkles of a print substrate before the above LUT is created. As a reference example, JP-A-2012-66426 discloses a technique for optimizing the weights of ink droplets discharged. More specifically, drive waveforms are selected to adjust the weights of the ink droplets.

SUMMARY

The ink ejection amount limit is determined so as to suppress bleeding of ink dots and wrinkles of a print substrate rather than to enhance color reproducibility.

An advantage of some aspects of the invention is that an ink amount upper limit setting apparatus, an ink amount upper limit setting method, and a non-transitory computer readable medium make it possible to set an ink amount upper limit in a convenient manner with a high degree of color reproducibility achieved.

According to a first aspect of the invention, an ink amount upper limit setting apparatus sets an ink amount upper limit for a plurality of inks to be used by an output device. The ink amount upper limit is an upper limit of the amount per unit area of the inks that the output device is permitted to discharge. This ink amount upper limit setting apparatus includes: a target color designating section that accepts designation of at least one target color for which the ink amount upper limit is to be set; a correspondence relationship defining section that defines a correspondence relationship between coordinate values in a predetermined color space and output values, on the basis of ink amount upper limit candidates, the output values indicating the used amounts of the respective inks, the ink amount upper limit candidates being candidates for the ink amount upper limit; a patch controller that converts surface color coordinate values into the output values on the basis of the correspondence relationship and causes the output device to form patches in accordance with the output values, the surface color coordinate values indicating colors of surfaces of a color reproduction region, the color reproduction region being a range of colors in the predetermined color space, the colors to be reproduced by the output device; a colorimetric value acquiring section that acquires colorimetric values of the formed patches, the colorimetric values indicating colors in the predetermined color space; and a color reproduction determination output section that outputs color reproduction determination information on the basis of a coordinate value of the target color in the predetermined color space and the colorimetric values, the color reproduction determination information indicating whether the target color is contained in the color reproduction region for each of the ink amount upper limit candidates.

According to a second aspect of the invention, an ink amount upper limit setting method is a method of setting an ink amount upper limit for a plurality of inks to be used by an output device. The ink amount upper limit is an upper limit of the amount per unit area of the inks that the output device is permitted to discharge. This ink amount upper limit setting method includes: accepting designation of at least one target color for which the ink amount upper limit is to be set; defining a correspondence relationship between coordinate values in a predetermined color space and output values, on the basis of ink amount upper limit candidates, the output values indicating the used amounts of the respective inks, the ink amount upper limit candidates being candidates for the ink amount upper limit; converting surface color coordinate values into the output values on the basis of the correspondence relationship and causes the output device to form patches in accordance with the output values, the surface color coordinate values indicating colors of surfaces of a color reproduction region, the color reproduction region being a range of colors in the predetermined color space, the colors to be reproduced by the output device; acquiring colorimetric values of the formed patches, the colorimetric values indicating colors in the predetermined color space; and outputting color reproduction determination information on the basis of a coordinate value of the target color in the predetermined color space and the colorimetric values, the color reproduction determination information indicating whether the target color is contained in the color reproduction region for each of the ink amount upper limit candidates.

The foregoing first and second aspects provide an ink amount upper limit setting apparatus, an ink amount upper limit setting method, and a non-transitory computer readable medium that make it possible to set an ink amount upper limit in a convenient manner with a high degree of color reproducibility achieved.

BRIEF DESCRIPTION OF THE DRAWINGS

The invention will be described with reference to the accompanying drawings, wherein like numbers reference like elements.

FIG. 14A is a schematic view of an example of a determination result output screen.

FIG. 14B is a schematic view of another example of the determination result output screen.

FIG. 15A is a schematic view of still another example of the determination result output screen.

FIG. 15B is a schematic view of yet another example of the determination result output screen.

DESCRIPTION OF EXEMPLARY EMBODIMENTS

Some embodiments of the invention will be described below. It should be noted that the following embodiments are examples of the invention and thus the characteristics of the embodiments are not always essential.

(1) OUTLINE OF THE TECHNOLOGY

The outlines of the technology included in the invention will be described with reference to the examples illustrated in FIGS. 1 to 16. The accompanying drawings schematically illustrate examples of the invention, and scales in individual directions may be different and thus inconsistent across the drawings.

First Aspect

Figure 1:
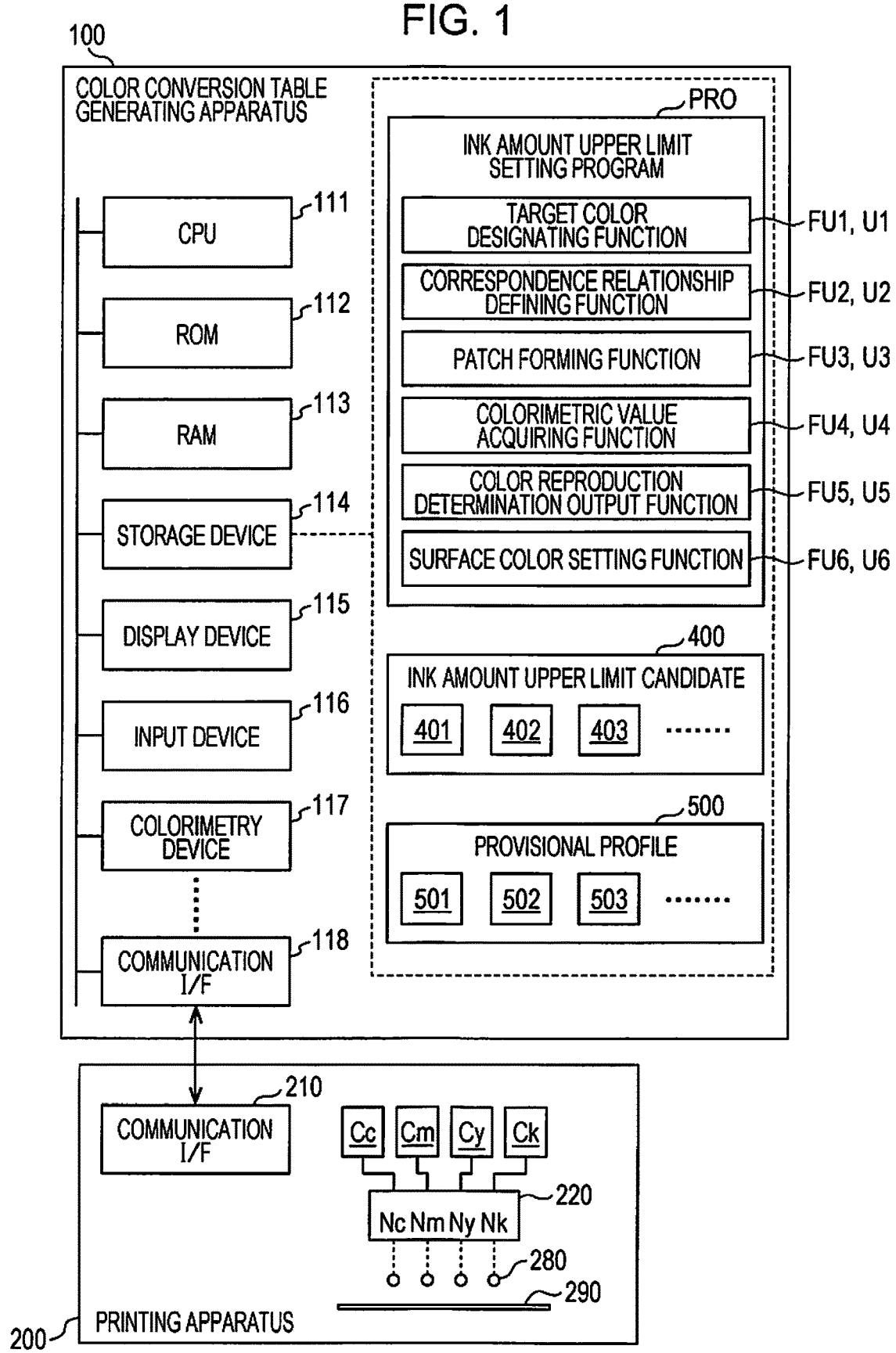
FIG. 1 is a schematic block diagram illustrating an example of a configuration of a color conversion table generating apparatus.
Figure 7:
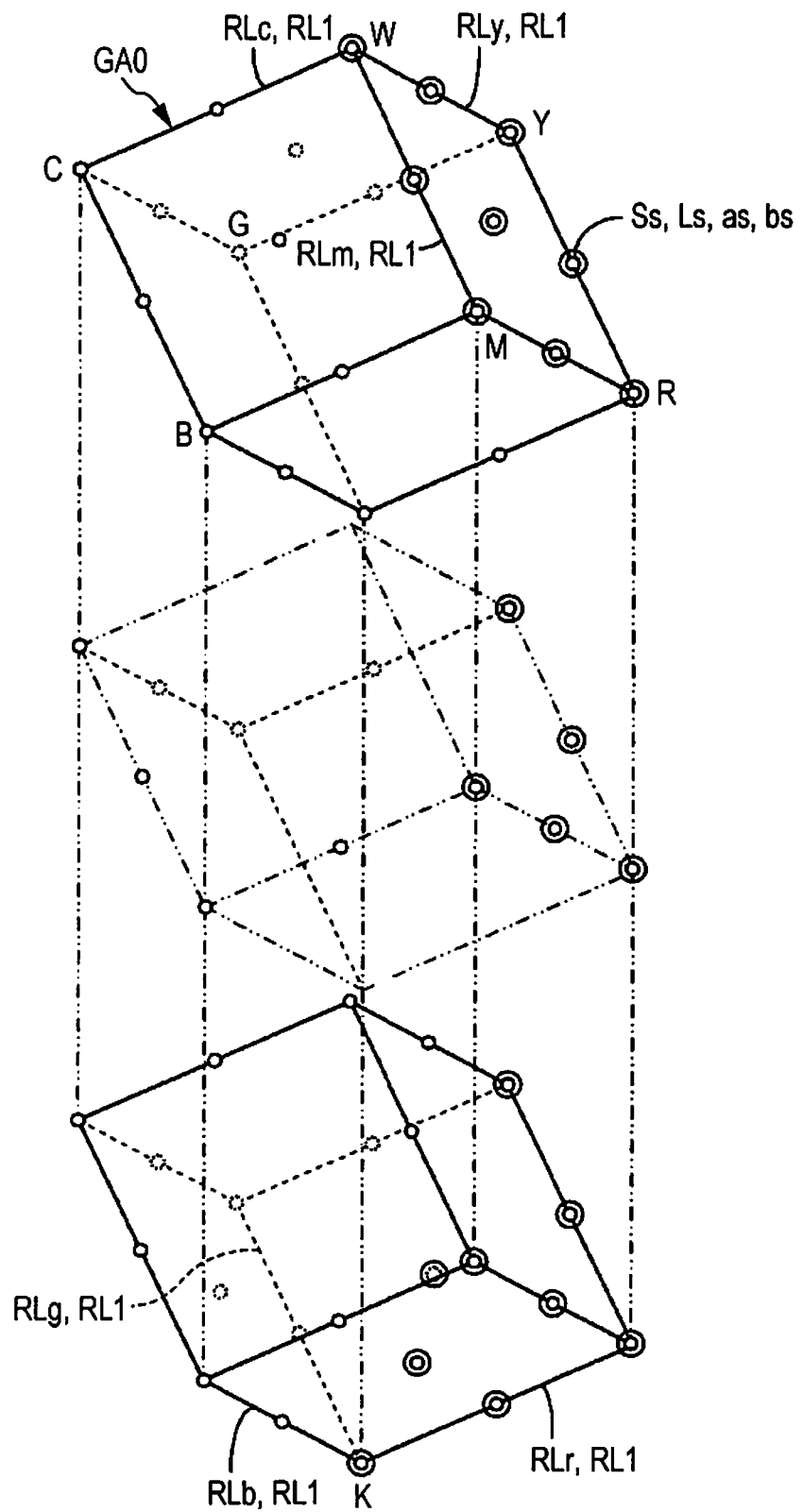
FIG. 7 is a schematic diagram illustrating an example of points on the surface of a color reproduction region from which surface color coordinate values are acquired.
Figures 8A, 8B, 8C:
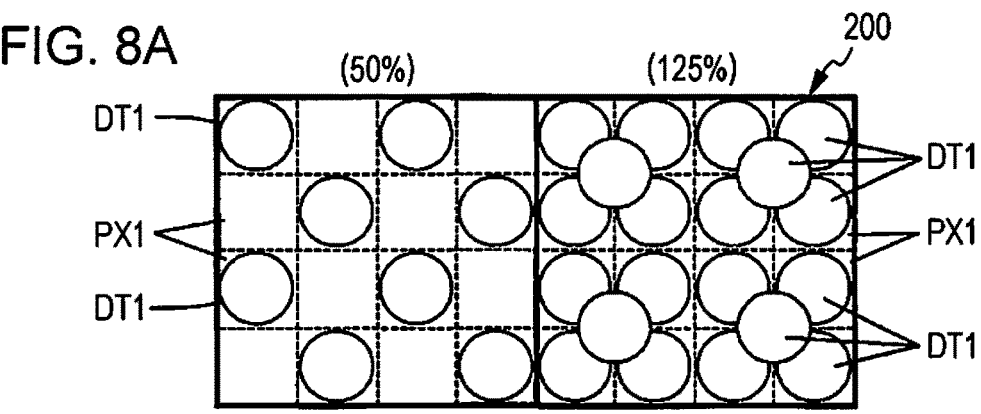
FIG. 8A is a schematic view of an example of an ink ejection amount.
FIG. 8B is a schematic view of an example of ink amount upper limit candidate groups according to print setting.
FIG. 8C is a schematic view of an example of ink amount upper limit candidates.

As illustrated in FIG. 1, a color conversion table generating apparatus 100, which is an example of an ink amount upper limit setting apparatus, includes a target color designating section U1, a correspondence relationship defining section U2, a patch controller U3, a colorimetric value acquiring section U4, and a color reproduction determination output section U5. The color conversion table generating apparatus 100 sets an ink amount upper limit UL, for example at Step S122 in FIG. 2. The ink amount upper limit UL is the upper limit of the amount per unit area of inks, such as cyan, magenta, yellow, and black inks, that an output device (e.g., printing apparatus 200) is permitted to discharge. The target color designating section U1 accepts the designation of at least one target color, such as a target color Tt in FIG. 3A, for which the ink amount upper limit UL is to be set. The correspondence relationship defining section U2 defines the correspondence relationship between coordinate values in a predetermined color space and output values that indicate the used amounts of the inks, on the basis of ink amount upper limit candidates 400, as illustrated in FIG. 8C, which are candidates for the ink amount upper limit UL. In this case, the coordinate values in the predetermined color space may be coordinate values (Lp, ap, bp) in a Lab color space, for example. The output values may be output values (Cp, Mp, Yp, Kp), for example. The patch controller U3 converts surface color coordinate values into output values in accordance with the correspondence relationship (e.g., provisional profiles 500). The output values indicate the colors of the surfaces of a color reproduction region GA0 as illustrated in FIG. 7, which is a range of colors in the predetermined color space; the colors are to be reproduced by the printing apparatus 200. Then, the patch controller U3 causes the printing apparatus 200 to form patches PA1 in accordance with the output values. In this case, the colors of the surfaces of the color reproduction region GA0 may be surface colors Ss, for example. The surface color coordinate values may be surface color coordinate values (Ls, as, bs), for example. The output values may be output values (Cs, Ms, Ys, Ks), for example. The colorimetric value acquiring section U4 acquires colorimetric values that indicate the colors of the formed patches PA1 in the predetermined color space. In this case, the colorimetric values may be colorimetric values (Lm, am, bm), for example. The color reproduction determination output section U5 outputs color reproduction determination information 700, for example, as illustrated in FIG. 14A, 14B, 15A, or 15B, on the basis of a coordinate value (Lt, at, bt) of the target color Tt in the predetermined color space and the colorimetric values (Lm, am, bm). The color reproduction determination information 700 indicates whether the target color Tt is contained in the color reproduction region GA0 for each of the ink amount upper limit candidates 400.

According to the foregoing first aspect, the correspondence relationship is defined on the basis of each ink amount upper limit candidate 400. In accordance with this correspondence relationship, the surface color coordinate values (Ls, as, bs) that indicate the surface colors Ss of the color reproduction region GA0 are converted into the output values (Cs, Ms, Ys, Ks) that indicate the used amounts of the inks. As a result, the patches PA1 are formed. Then, the colorimetric values (Lm, am, bm) of the patches PA1 in the predetermined color space are acquired. After that, the color reproduction determination information 700 is output. In this case, the color reproduction determination information 700 indicates whether the target color Tt is contained in the color reproduction region GA0 for each of the ink amount upper limit candidates 400 on the basis of the coordinate value (Lt, at, bt) of the target color Tt in the predetermined color space and the colorimetric values (Lm, am, bm). Thus, a user can recognize whether each ink amount upper limit candidate 400 enables a desired color to be reproduced. Consequently, the first aspect can provide an ink amount upper limit setting apparatus that can set an ink amount upper limit in a convenient manner, with a high degree of color reproducibility achieved.

The predetermined color space is preferably a device independent color space although it is not limited to any specific color space. Preferred examples of the device independent color space include a CIE (international commission on illumination) L*a*b* color space, L*u*v* color space, and other uniform color spaces. If the L*a*b* color space is employed as the predetermined color space, each coordinate value may be expressed by lightness L* and chromaticity coordinates (a*, b*). In the following description, the marks "*" will be omitted as appropriate. The correspondence relationship may be a concept including a profile and an LUT; an example of the profile is an ICC (international color consortium) profile, and an example of the LUT is a color conversion LUT. The color reproduction determination information 700 may contain: information that indicates ink amount upper limit candidates 400 for which the target color Tt is contained in the color reproduction region GA0; and information that indicates ink amount upper limit candidates 400 for which target color Tt is not contained in the color reproduction region GA0. The expression "outputting the color reproduction determination information 700" may refer to any operation that enables a user to check the color reproduction determination information, examples of which include operations of displaying the color reproduction determination information 700 and printing the color reproduction determination information 700.

Second Aspect

As illustrated in FIG. 8C, for example, the ink amount upper limit candidates 400 may include a plurality of ink amount upper limit candidates having different ink amount upper limits, such as ink amount upper limit candidates 401 to 403. The color reproduction determination output section U5 may select two or more from these ink amount upper limit candidates and may determine whether the target color Tt is contained in the color reproduction region GA0 for each of the selected ink amount upper limit candidates. If it is determined that there are a plurality of color reproduction intra-regional candidates, which are ink amount upper limit candidates for which the target color Tt is contained in the color reproduction region GA0, the color reproduction determination output section U5 may output information that recommends the one of the color reproduction intra-regional candidates which has the lowest ink amount upper limit. In the example of FIG. 14A, the plurality of color reproduction intra-regional candidates may be color reproduction intra-regional candidates 612 and 613, and the recommended color reproduction intra-regional candidate may be the color reproduction intra-regional candidate 612. This enables a user to identify which of the ink amount upper limit candidates 400 makes it possible to reproduce a desired color with the lowest ink amount upper limit. In this way, the foregoing second aspect can provide a technique for setting an ink amount upper limit with a minimal consumption of inks.

Third Aspect

The ink amount upper limit candidates 400 may include at least a first ink amount upper limit candidate and a second ink amount upper limit candidate that have different ink amount upper limits. An example of the first ink amount upper limit candidate is the ink amount upper limit candidate 401 illustrated in FIG. 8C, and an example of the second ink amount upper limit candidate is the ink amount upper limit candidate 402. First, the color reproduction determination output section U5 may determine whether the target color Tt is contained in the color reproduction region GA0 for the first ink amount upper limit candidate. If it is determined that the target color Tt is not contained in the color reproduction region GA0 for the first ink amount upper limit candidate, for example, as illustrated in FIG. 15A, then, the color reproduction determination output section U5 may output information that recommends the second ink amount upper limit candidate. This enables a user to recognize that the second ink amount upper limit candidate is still left if the first ink amount upper limit candidate does not make it possible to reproduce a desired color. In this way, the foregoing third aspect can provide a technique tailored to set an ink amount upper limit in a convenient manner, with a high degree of color reproducibility achieved.

Fourth Aspect

The color conversion table generating apparatus 100 may further include a surface color setting section U6 that sets a plurality of surface color coordinate values (Ls, as, bs) on the basis of the target color Tt. The patch controller U3 may cause the printing apparatus 200 to form the patches PA1 on the basis of the plurality of surface color coordinate values (Ls, as, bs). The colorimetric value acquiring section U4 may acquire colorimetric values (Lm, am, bm) of the plurality of patches PA1 formed in the above manner. The color reproduction determination output section U5 may output the color reproduction determination information 700 on the basis of the coordinate value (Lt, at, bt) of the target color Tt in the predetermined color space and the plurality of calorimetric values (Lm, am, bm). In this way, the foregoing fourth aspect can provide a technique tailored to set an ink amount upper limit in a convenient manner, with a high degree of color reproducibility achieved.

Fifth Aspect

Figure 6A:
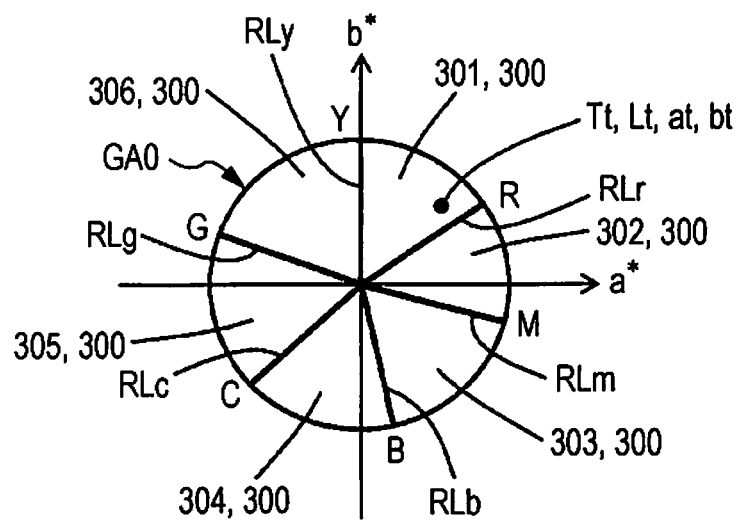
FIG. 6A is a schematic diagram illustrating an example of hue regions to be defined.
Figure 6B:
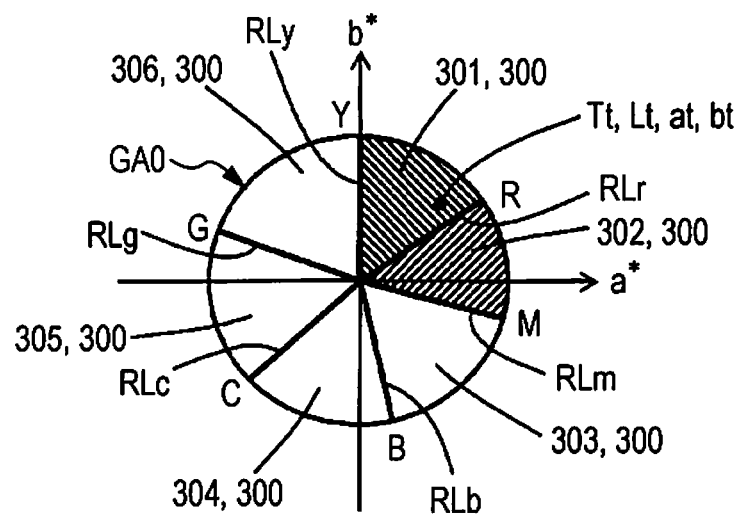
FIG. 6B is a schematic diagram illustrating an example of the hue regions that have been selected.

As illustrated in FIGS. 6A, 6B, and 7, far example, the surface color setting section U6 may divide the predetermined color space into a plurality of hue regions 300 having different hue ranges. Then, the surface color setting section U6 may set a plurality of surface color coordinate values (Ls, as, bs) that indicate surface colors Ss of one or more hue regions 300 that include at least a hue region, such as an inclusive hue region 301, containing the target color Tt. In this way, the foregoing fifth aspect can provide a technique for setting an ink amount upper limit with a small number of patches.

Sixth Aspect

As illustrated in FIGS. 6A, 6B, and 7, for example, the plurality of hue regions 300 may be separated from one another by borders of three or more hues selected from yellow (Y), red (R), magenta (M), blue (B), cyan (C), and green (G). The surface color setting section U6 may set a plurality of surface color coordinate values (Ls, as, bs) that indicate surface colors Ss of a first hue region and a second hue region. The first hue region may be a hue region that contains a target color Tt, such as an inclusive hue region 301, for example. The second hue region may be one of two hue regions which are adjacent to the first hue region in a hue direction and which has a hue closer to a hue of the target color, such as a proximity hue region 302. The plurality of surface color coordinate values (Ls, as, bs) may contain a plurality of border color coordinate values that indicate the hues of the borders. In this way, the foregoing fifth aspect can provide a technique tailored to set an ink amount upper limit with a small number of patches.

Seventh Aspect

As illustrated in FIG. 7, for example, the surface color setting section U6 may set at least the plurality of surface color coordinate values to apexes of the surfaces of the color reproduction region GA0 which correspond to different colors, such as white (W), Y, R, M, B, C, G, and black (K). This seventh aspect can also provide a technique tailored to set an ink amount upper limit with a small number of patches. Each apex of the surfaces of the color reproduction region indicates that no inks are used or that preset maximum amounts of inks are used. For example, if a certain apex has a primary color such as C, M, or Y, the ink that can create this primary color is used at this apex by the ink amount upper limit preset for this ink. If a certain apex has a secondary color such as G but a G ink is not available, two inks that can be mixed to create this secondary color are used at this apex by the ink amount upper limits preset for these inks. For example, suppose the ink amount upper limit of a C ink is set to 80%, the ink amount upper limit of a Y ink is set to 80%, and the ink amount upper limit of the mixture of the C and Y inks is set to 120%. If equal amounts of C and Y inks are used at an apex indicating a secondary color that can be created from the mixture of C and Y, 60% of the C ink and 60% of the Y ink are used at this apex. This is also applicable to a tertiary color and higher-order colors. The color reproduction region made up of three colors has 8 (=$2^3$) apexes. In this case, surface color coordinate values may be set to some of these apexes. The color reproduction region made up of four colors has 16 (=$2^4$) apexes.

Eighth Aspect

Figure 11:
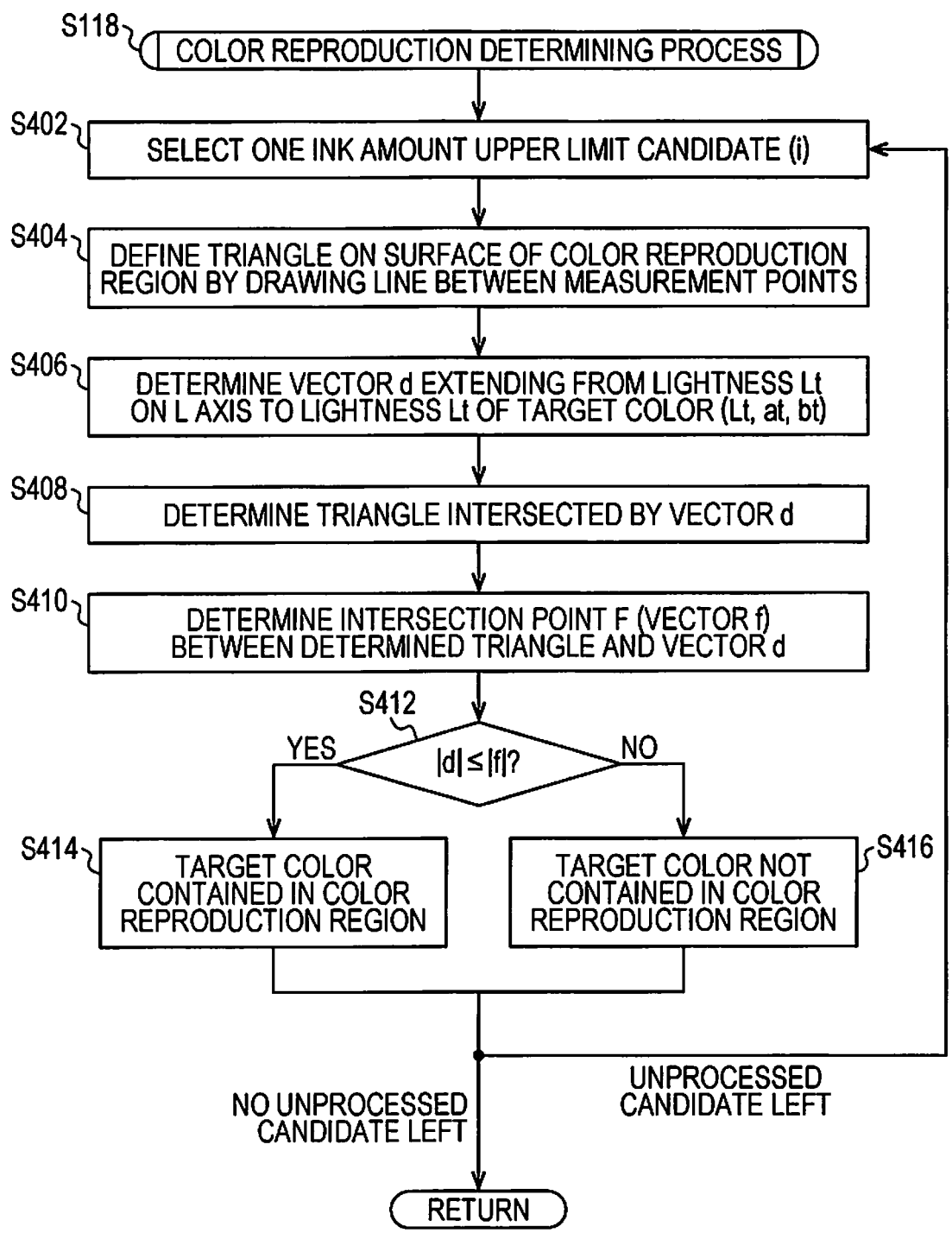
FIG. 11 is a flowchart of an example of a color reproduction determining process.
Figure 13A:
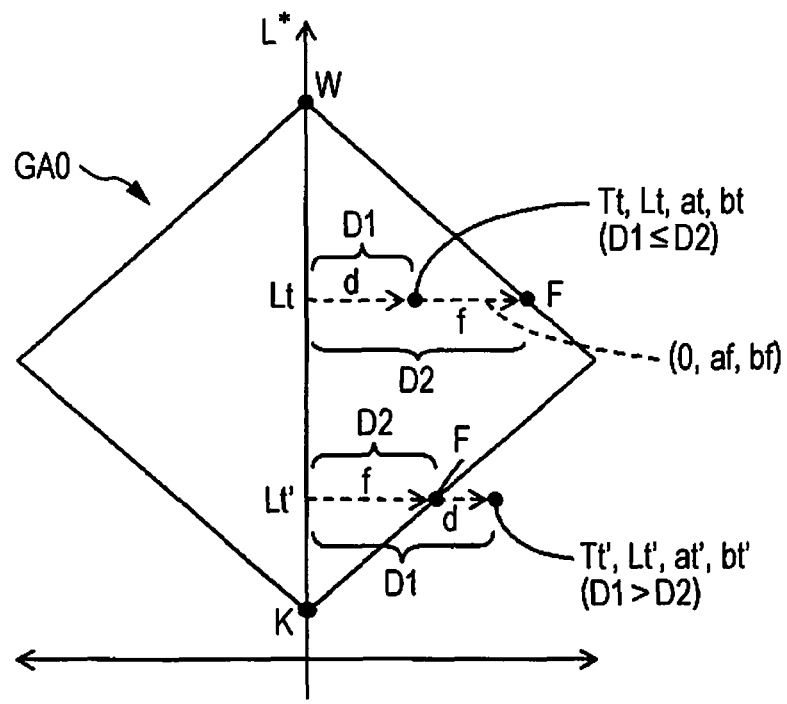
FIG. 13A is a schematic diagram illustrating an example of a process of determining whether a target color is contained within a color reproduction region in a plane along an achromatic color axis.

The predetermined color space may be a color space defined by an achromatic color axis, such as an L axis, and two chroma axes, such as a and b axes, that intersect each other. As illustrated in FIGS. 11 and 13A, for example, the color reproduction determination output section U5 may determine whether a first distance D1 is the same as or shorter than a second distance D2. The first distance is a distance between lightness Lt on the achromatic color axis and lightness Lt of the target color Tt in the predetermined color space. The second distance is a distance between the lightness on the achromatic color axis and lightness on a surface of the color reproduction region GA0 in the predetermined color space. When it is determined that the first distance D1 is the same as or shorter than the second distance D2, the color reproduction determination output section U5 may output the color reproduction determination information 700 indicating that the target color Tt is contained in the color reproduction region GA0. In this way, the foregoing eighth aspect can provide a technique tailored to set an ink amount upper limit with a small number of patches.

Ninth Aspect

Figure 2:
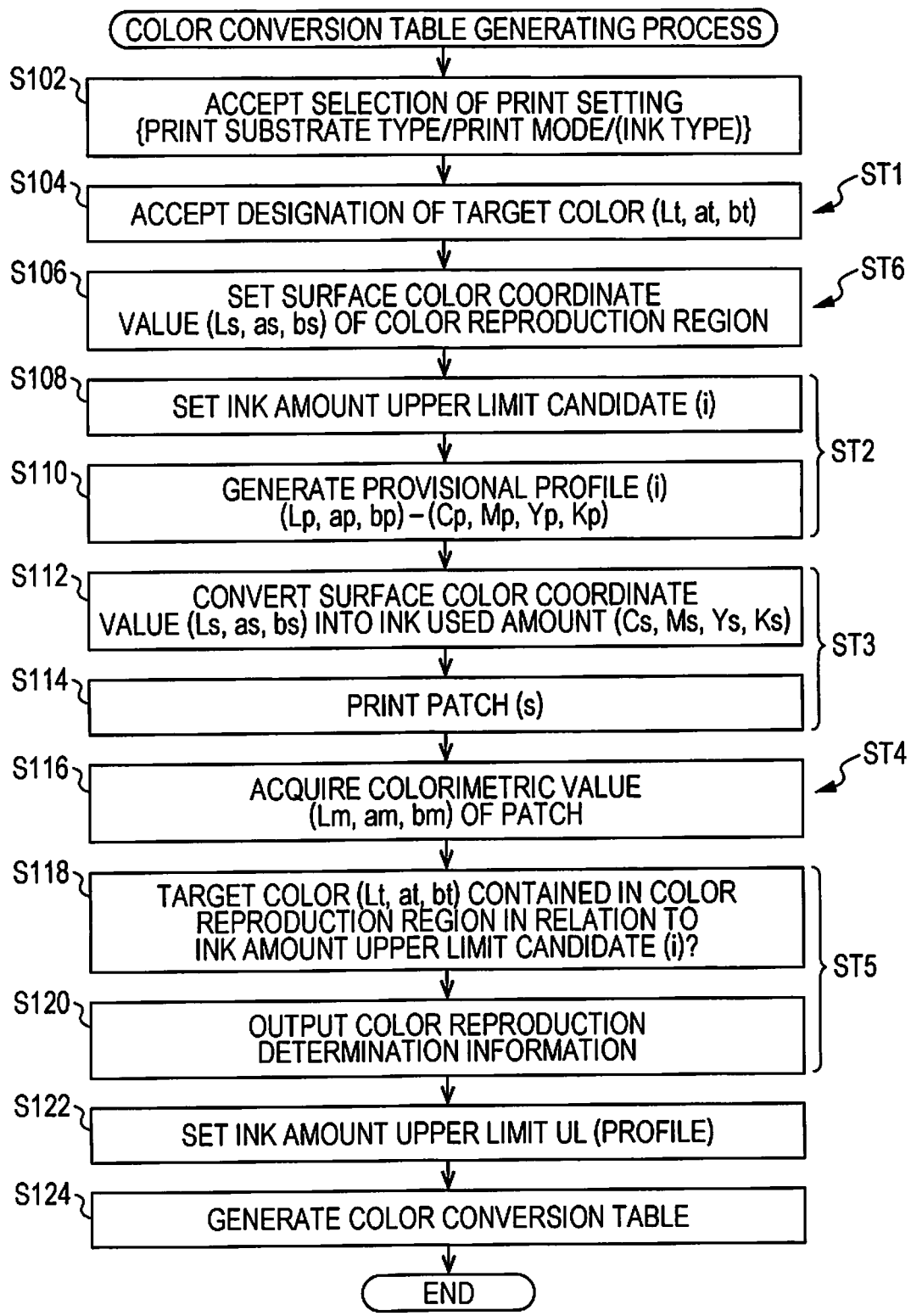
FIG. 2 is a flowchart of an example of a color conversion table generating process.

As illustrated in FIG. 2, for example, an ink amount upper limit setting method includes: a target color designating step ST1 performed by the target color designating section U1; a correspondence relationship defining step ST2 performed by the correspondence relationship defining section U2; a patch forming step ST3 performed by the patch controller U3; a colorimetric value acquiring step ST4 performed by the colorimetric value acquiring section U4; and a color reproduction determination output step ST5 performed by the color reproduction determination output section U5. The ninth aspect can provide an ink amount upper limit setting method of setting an ink amount upper limit in a convenient manner, with a high degree of color reproducibility achieved. This ink amount upper limit setting method may further include a surface color setting step ST6 performed by the surface color setting section U6.

Tenth Aspect

As illustrated in FIG. 1, for example, an ink amount upper limit setting program PRO causes a computer to fulfill: a target color designating function FU1 of the target color designating section U1; a correspondence relationship defining function FU2 of the correspondence relationship defining section U2; a patch forming function FU3 of the patch controller U3; a colorimetric value acquiring function FU4 of the colorimetric value acquiring section U4; and a color reproduction determination output function FU5 of the color reproduction determination output section U5. The tenth aspect can provide the ink amount upper limit setting program PRO that causes a computer to set an ink amount upper limit in a convenient manner with a high degree of color reproducibility achieved. This ink amount upper limit setting program PRO may cause a computer to further fulfill a surface color setting function FU6 of the surface color setting section U6.

The embodiments of the technology are applicable to: for example a color conversion table generating apparatus that includes an ink amount upper limit setting apparatus; a composite apparatus that includes an ink amount upper limit setting apparatus; a method of generating a color conversion table; a method of controlling an ink amount upper limit setting apparatus; a method of controlling a color conversion table generating apparatus; a method of controlling a composite apparatus; a program for generating a color conversion table; a program for controlling a color conversion table generating apparatus; a program for controlling a composite apparatus; and a non-transitory, computer readable medium on which an ink amount upper limit setting program or a control program is stored. Each of these apparatuses may include a plurality of independent constituent elements.

(2) SPECIFIC EXAMPLES OF COLOR CONVERSION TABLE GENERATING APPARATUS

Figure 16:
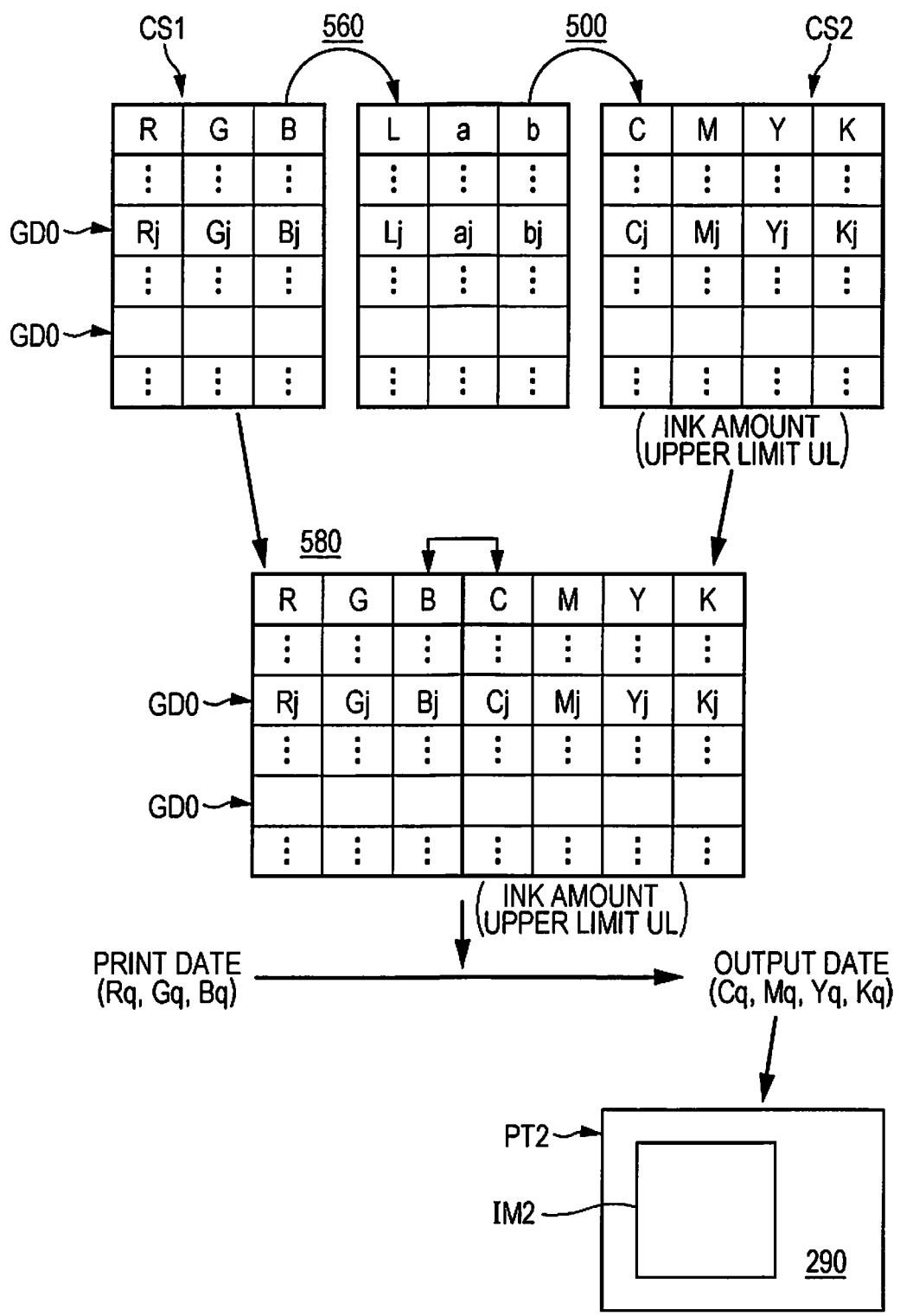
FIG. 16 is a schematic diagram illustrating an example of a process of generating a color conversion table.

FIG. 1 is a schematic block diagram illustrating an example of a configuration of the color conversion table generating apparatus 100, which is an example of the ink amount upper limit setting apparatus. As illustrated in FIG. 1, the color conversion table generating apparatus 100 includes: for example a central processing unit (CPU) 111; a read only memory (ROM) 112; a random access memory (RAM) 113; a storage device 114; a display device 115; an input device 116; a colorimetry device 117; and a communication interface (I/F) 118, which are all connected together so as to transmit or receive information. The color conversion table generating apparatus 100 generates a color conversion table 580, for example, as illustrated in FIG. 16. The color conversion table 580 is a lookup table (LUT) in which the correspondence relationship between an input value (Rj, Gj, Bj) and an output value (Cj, Mj, Yj, Kj) is defined at each individual grid point GD0. The input value (Rj, Gj, Bj) indicates the amounts of R (red), G (green), and B (blue) colors; the output value (Cj, Mj, Yj, Kj) indicates the used amounts of C (cyan), M (magenta), Y (yellow), K (black) inks. Each of The input values (Rj, Gj, Bj) and the output values (Cj, Mj, Yj, Kj) may be 256 or 216 levels of gradation value, for example. The grid points GD0 may be virtual points arranged in an input color space, and the output coordinate values may correspond to the locations of the grid points GD0 in the input color space and may be stored at the corresponding grid points GD0. In this embodiment, a plurality of grid points GD0 may be arranged either regularly or irregularly in the input color space.

In the storage device 114, color conversion table generating programs, including the ink amount upper limit setting program PRO, and ink amount upper limit candidates 401, 402, 403, and so on are stored. The ink amount upper limit candidates 401, 402, 403, and so on may be collectively referred to below as the ink amount upper limit candidates 400. In the storage device 114, the provisional profiles 501, 502, 503, and so on are stored. The provisional profiles 501, 502, 503, and so on may be collectively referred to below as the provisional profiles 500. The storage device 114 may be implemented using, for example a nonvolatile semiconductor memory, such as a flash memory, and a magnetic storage device, such as a hard disk. The display device 115 may be implemented using a liquid crystal display panel, for example. The input device 116 may be implemented using a pointing device, a hard key such as a keyboard, a touch panel mounted on the surface of a display panel, for example. The colorimetry device 117 measures the colors of patches, such as the patches PA1 illustrated in FIG. 10, formed on a print substrate 290 and then outputs the colorimetric values, such as colorimetric values (Lm, am, bm). The patches may also be referred to as the color charts. The colorimetry device 117 may be provided outside the color conversion table generating apparatus 100. The color conversion table generating apparatus 100 acquires the colorimetric values from the colorimetry device 117 and then performs various processes. The communication I/F 118 is connected to a communication I/F 210 of the printing apparatus 200, which is an example of the output device, and transmits information to the printing apparatus 200 or receives information from the printing apparatus 200 via the communication I/Fs 118 and 210. Each of the communication I/Fs 118 and 210 may conform to universal serial bus (USB) or short-distance communication specifications, for example. The communication I/Fs 118 and 210 may conduct wired or wireless communication with each other over a network such as a local area network (LAN) or the Internet.

As illustrated in FIG. 1, the ink amount upper limit setting program PRO causes the color conversion table generating apparatus 100 to fulfill the target color designating function FU1, the correspondence relationship defining function FU2, the patch forming function FU3, the colorimetric value acquiring function FU4, the color reproduction determination output function FU5, and the surface color setting function FU6. The color conversion table generating apparatus 100 may be implemented using a personal computer, a tablet terminal, or other information processing device. In the color conversion table generating apparatus 100, the CPU 111, the ROM 112, the RAM 113, the storage device 114, the display device 115, the input device 116, the colorimetry device 117, and the communication I/F 118 may be packed in a single casing or mounted in a plurality of independent devices that can communicate with one another.

Moreover, the color conversion table generating apparatus 100 may be provided in the printing apparatus 200, and the printing apparatus 200 may perform the color conversion table generating process.

Figure 10:
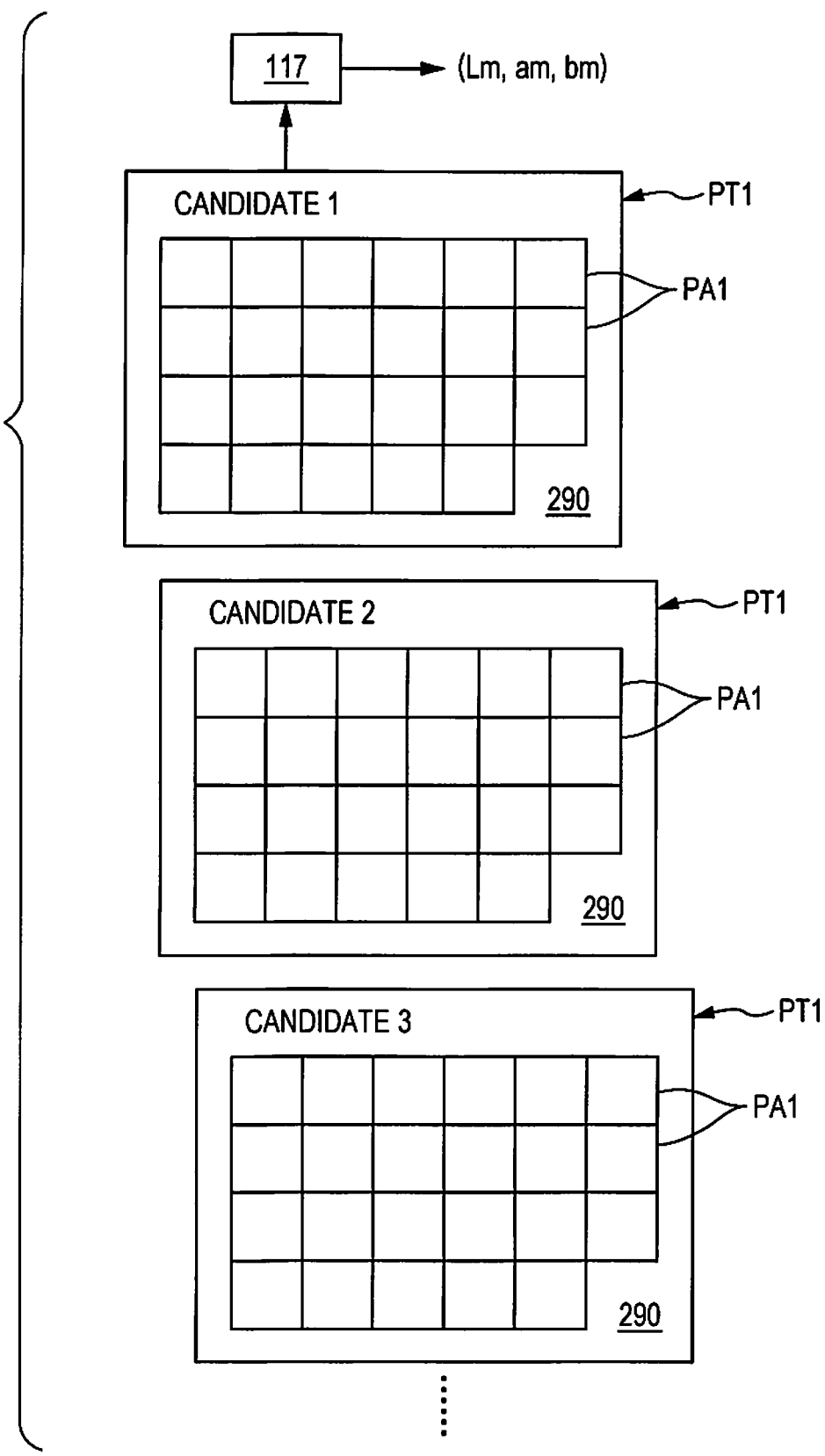
FIG. 10 is a schematic view of an example of a process of acquiring colorimetric values of patches.

As illustrated in FIG. 1, the printing apparatus 200 may be an ink jet printer that discharges C, M, Y, and K inks from a recording head 220, thereby creating a printed image over the print substrate 290. The recording head 220 is supplied with the C, M, Y, and K inks from ink cartridges Cc, Cm, Cy, and Ck, respectively, and discharges C, M, Y, and K ink droplets 280 from nozzles Nc, Nm, Ny, and Nk, respectively. When the ink droplets 280 are placed on the print substrate 290, ink dots DT1 are formed on the print substrate 290, for example, as illustrated in FIG. 8A. This provides a printed matter PT1 containing the patches PA1, for example, as illustrated in FIG. 10 or a printed matter PT2 having a printed image IM2 thereon, for example, as illustrated in FIG. 16.

The printing apparatus 200 receives print data based on an output image generated by the color conversion table generating apparatus 100. Then, the printing apparatus 200 creates the printed image associated with the output image over the print substrate 290 on the basis of the print data. The printing apparatus 200 may be equipped with the functions of a copying machine, a facsimile machine, or other OA apparatuses.

(3) SPECIFIC EXAMPLE OF COLOR CONVERSION TABLE GENERATING PROCESS

FIG. 2 is a flowchart of an example of a color conversion table generating process performed by the color conversion table generating apparatus 100 illustrated in FIG. 1. In this example, the processes at Steps S102 to S122 are realized by the ink amount upper limit setting program PRO. Step S104 is related to the target color designating step ST1, the target color designating function FU1, and the target color designating section U1. Step S106 is related to the surface color setting step ST6, the surface color setting function FU6, and the surface color setting section U6. Steps S108 to S110 are related to the correspondence relationship defining step ST2, the correspondence relationship defining function FU2, and the correspondence relationship defining section U2. Steps S112 to S114 are related to the patch forming step ST3, the patch forming function FU3, and the patch controller U3. Step S116 is related to the colorimetric value acquiring step ST4, the colorimetric value acquiring function FU4, and the colorimetric value acquiring section U4. Steps S118 to S120 are related to the color reproduction determination output step ST5, the color reproduction determination output function FU5, and the color reproduction determination output section U5. In this case, the processes at Steps ST1 to ST6 do not necessarily have to be performed in the sequence of the flowchart in FIG. 2.

When starting the process, at Step S102, the color conversion table generating apparatus 100 accepts the selections of print settings associated with the color reproducibility. Examples of the print settings include the type of a print substrate, a printing mode such as a print resolution or a recording type, and the type of inks. At Step S102, for example, a user may operate the input device 116 to select one from print setting items, and then the color conversion table generating apparatus 100 may accept this selection.

At Step S104, the color conversion table generating apparatus 100 accepts the designation of one or more target colors Tt (Lt, at, bt) for which ink amount upper limits UL are to be set, by using a Lab color space as a reference, which is an example of the predetermined color space. In this case, the variable t may be used to differentiate the target colors Tt. The Lab color space may be a color space defined by an L axis (achromatic color axis), an a axis (chroma axis), and a b axis (chroma axis) all of which intersect one another. In addition, the Lab color space may be a device independent color space or a uniform color space.

Figure 3A:
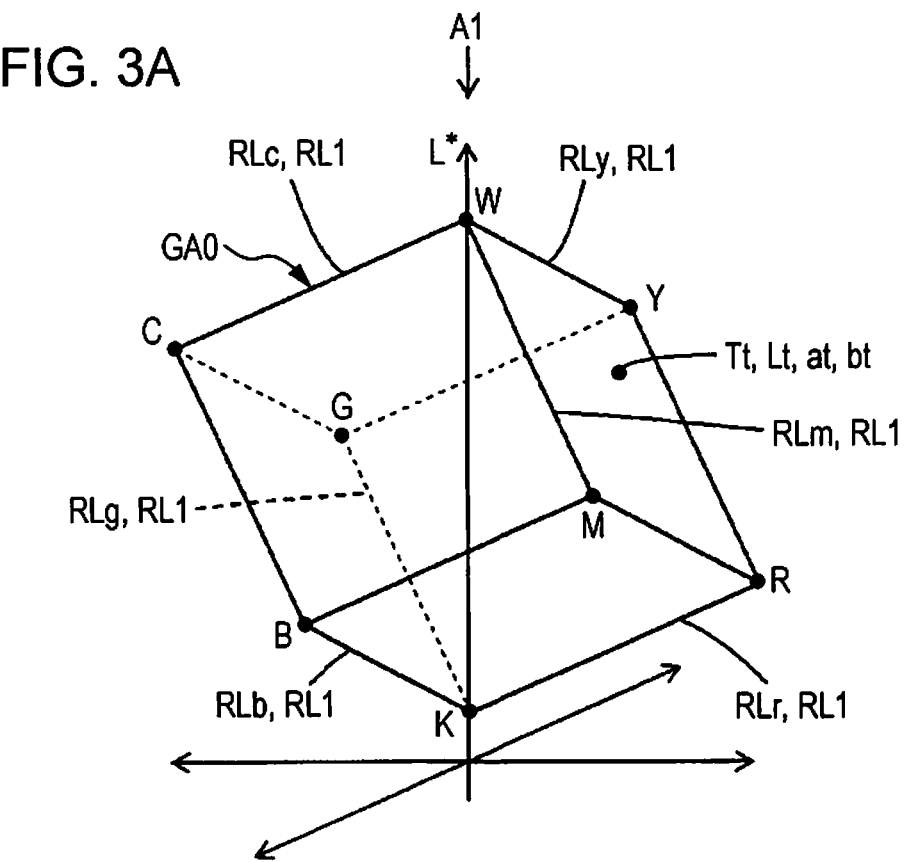
FIG. 3A is a schematic diagram illustrating an example of a color reproduction region in a predetermined color space.

An example of a color reproduction region created using the Lab color space as a reference will be described with reference to FIG. 3A. A color reproduction region GA0 corresponds to the range of colors in the Lab color space which are to be reproduced by the printing apparatus 200. It should be noted that the color reproduction region GA0 in FIG. 3A that corresponds to the range of the colors to be reproduced with the C, M, Y, and K inks has a hexahedral shape, but an actual color reproduction region may have a more complicated shape with curved surfaces. In FIG. 3A, the vertical axis corresponds to the L axis of the Lab color space, and the horizontal axis corresponds to a chroma axis, such as the a or b axis, of the Lab color space. The chromaticity plane in FIG. 3A has a depth. For the purpose of helping an understanding, FIG. 3A illustrates: a ridge line RLy that connects an apex W (white) and an apex Y (yellow); a ridge line RLr that connects an apex K (black) and an apex R (red); a ridge line RLm that connects the apex W and an apex M (magenta); a ridge line RLb that connects the apex K and an apex B (blue); a ridge line RLc that connects the apex W and an apex C (cyan); and a ridge line RLg that connects the apex K and an apex G (green). The ridge lines RLy, RLr, RLm, RLb, RLc, and RLg may be collectively referred to below as the ridge lines RL1.

Figure 4A:
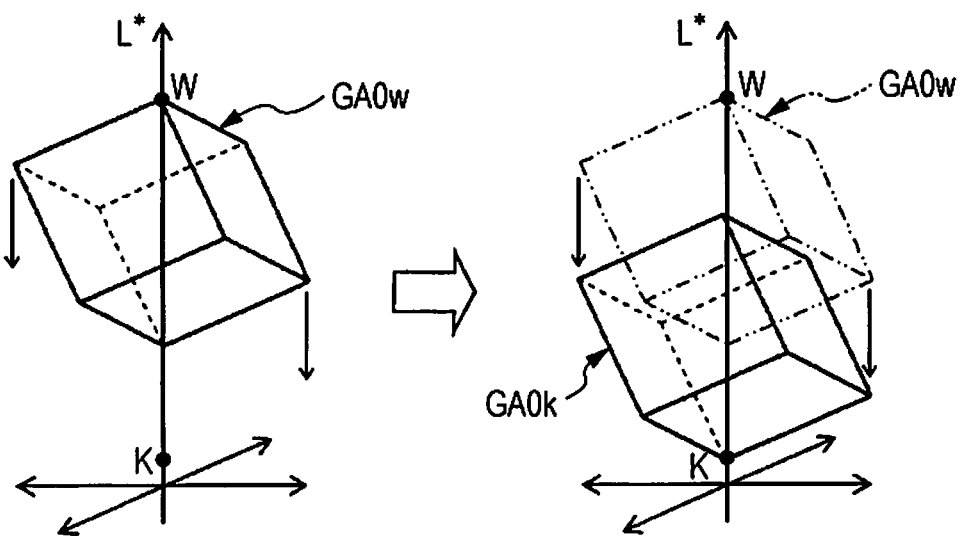
FIG. 4A is a schematic diagram illustrating an example of a color reproduction region made up of three colors which depends on the used amount of a black ink.
Figure 4B:
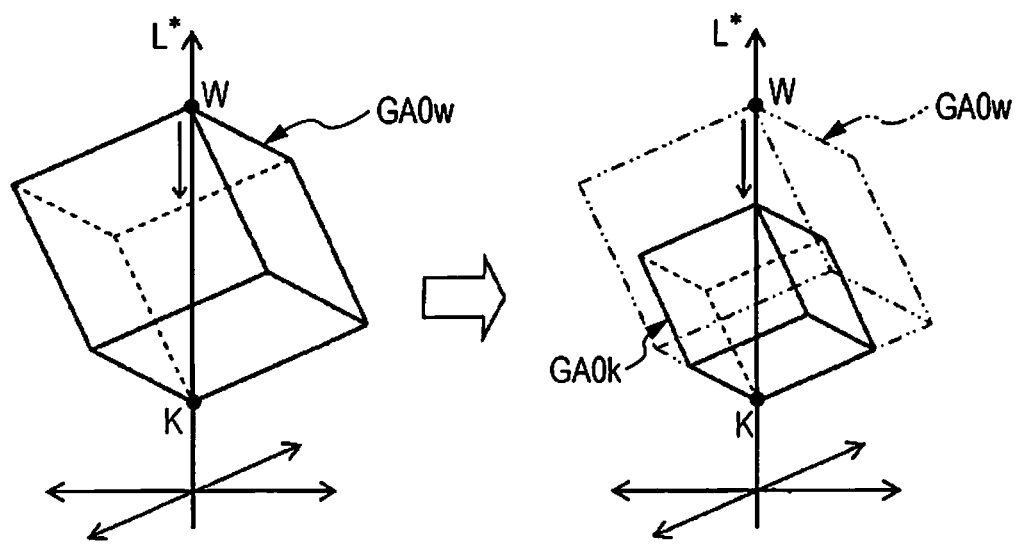
FIG. 4B is a schematic diagram illustrating another example of the color reproduction region made up of three colors which depends on the used amount of a black ink.

If an output color space CS2 is a four-dimensional device dependent color space, like the color conversion table 580 illustrated in FIG. 16, the color reproduction region that corresponds to the range of the colors to be reproduced with the C, M, and Y inks depends on the used amount of the K ink. FIGS. 4A and 4B each schematically illustrate the dependences of color reproduction regions GA0w and GA0k, each of which is made up three colors, on the used amount of the K ink.

As can be seen from the example of FIG. 4A, the minimum lightness of the three color reproduction region GA0k made up of three colors which is created with the use of the K ink is less than that of the color reproduction region GA0w made up of three colors which is created without the use of the K ink. In this case, a color reproduction region GA0 made up of four colors contains the color reproduction regions GA0w and GA0k each made up of three colors. As can be seen from the example of FIG. 4B, the color reproduction region GA0k made up of three colors which is created with the use of the K ink is smaller in size than the color reproduction region GA0w made up of three colors which is created without the use of the K ink. In this case, the four-color reproduction region GA0 may be expressed by the color reproduction region GA0w made up of three colors. However, it may be difficult to know in advance which of the examples of FIGS. 4A and 4B will emerge under various conditions, such as the types of the print substrate 290 and the inks. For this reason, the subsequent process will be described on the assumption that the color reproduction region made up of three colors is shifted to the lower lightness side in proportion to a used amount of the K ink, as illustrated in FIG. 4A.

The color reproduction region GA0 may depend on the ink ejection amount. Therefore, it is necessary to determine whether the target colors Tt are contained in the color reproduction region GA0, from colorimetric values of color patches formed with the inks of ink ejection amounts according to the ink amount upper limits. At Step S104 of FIG. 2, thus, the color conversion table generating apparatus 100 accepts the designation of the target colors Tt for which the ink amount upper limits of the inks are to be set.

Figure 3B:
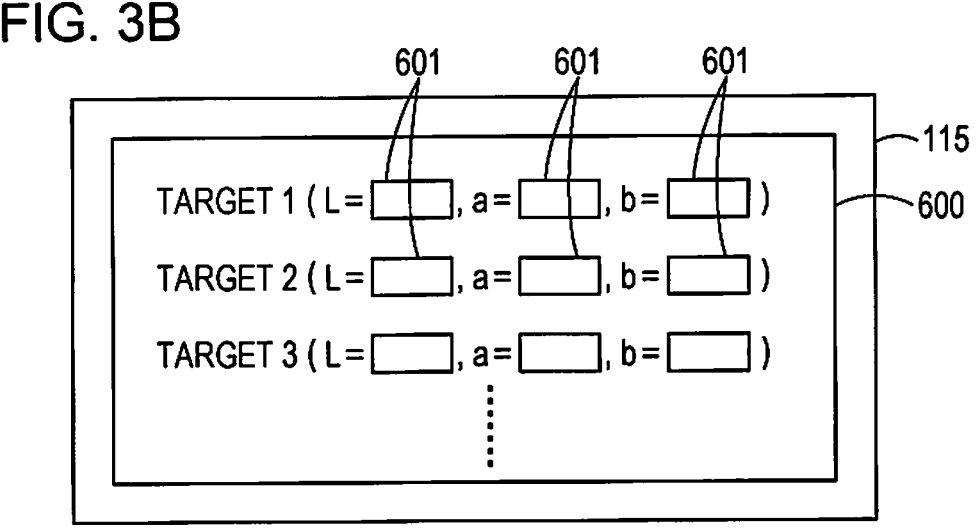
FIG. 3B is a schematic view of an example of a target color designation screen.

FIG. 3B schematically illustrates an example of the display of the target color designation screen in the display device 115 which is used to accept the designation of the target colors Tt (Lt, at, bt) for which the ink amount upper limits of the inks are to be set. As illustrated in FIG. 3B, the target color designation screen 600 enables a user to designate a plurality of target colors Tt. More specifically, the user can operate the input device 116 to input a Lab value of each target color Tt, which is a coordinate value (L, a, b) in the Lab color space, in the target color designation screen 600. For example, when the user operates the input device 116 to input the Lab value of target color 1 in entry fields 601, the color conversion table generating apparatus 100 may store this Lab value in the RAM 113 as the designated value of target color 1. This is also applicable to the processes of designating target colors 2, 3, and so on. However, a process of designating the target colors Tt is not limited to that using the target color designation screen 600.

Alternatively, the color conversion table generating apparatus 100 may display a schematic Lab color space as illustrated in FIG. 3A, and then a user may operate the input device 116 to designate positional coordinates of the target colors Tt.

After having accepted the designation of the target colors Tt, at Step S106 in FIG. 2, the color conversion table generating apparatus 100 sets a plurality of surface color coordinate values (Ls, as, bs) indicating the surface colors Ss (see FIG. 7) of the color reproduction region GA0 in the Lab color space, on the basis of the target colors Tt. In this case, the variable s may be used to differentiate locations of the surfaces of the color reproduction region GA0. The surface color coordinate values (Ls, as, bs) may be original data to be used to form the patches PA1 (see FIG. 10).

Figure 5:
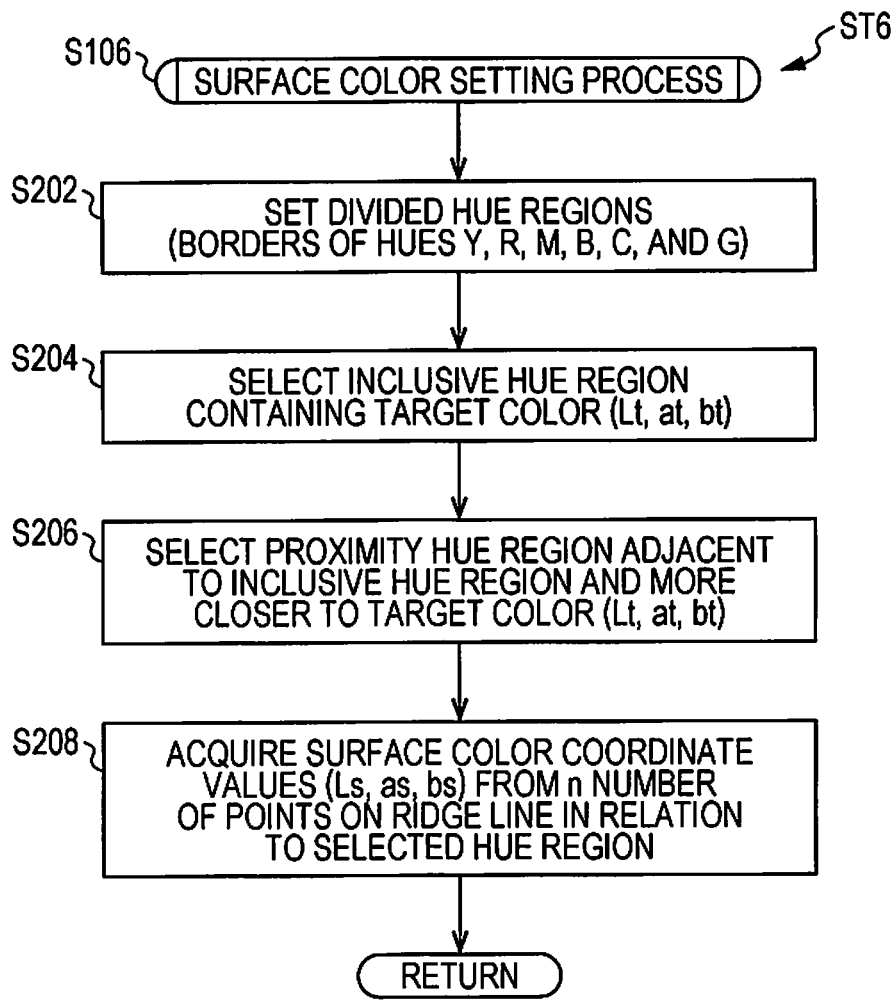
FIG. 5 is a flowchart of an example of a surface color setting process.

FIG. 5 is a flowchart of an example of the surface color setting process performed at Step S106. When this process starts, at Step S202, the color conversion table generating apparatus 100 divides the hue region in the Lab color space into the six hue regions 301 to 306, for example, as illustrated in FIG. 6A. In this case, the hue regions 301 to 306 are separated from one another by borders of the hues Y (yellow), R (red), M (magenta), B (blue), C (cyan), and G (green). FIG. 6A is a schematic diagram illustrating the color reproduction region GA0 as viewed from the direction A1 in FIG. 3A, in which the hue regions 300 are defined. In FIG. 6A, the horizontal axis represents the a axis, and the vertical axis represents the b axis. In the example of FIG. 6A, the range between the hues Y and R corresponds to the hue region 301; the range between the hues R and M corresponds to the hue region 302; the range between the hues M and B corresponds to the hue region 303; the range between the hues B and C corresponds to the hue region 304; the range between the hues C and G corresponds to the hue region 305; and the range between the hues G and Y corresponds to the hue region 306. These hue regions 301 to 306 may be collectively referred below to as the hue regions 300. In the color reproduction region GA0, the border of the hue Y corresponds to the ridge line RLy; the border of the hue R corresponds to the ridge line RLr; the border of the hue M corresponds to the ridge line RLm; the border of the hue B corresponds to the ridge line RLb; the border of the hue C corresponds to the ridge line RLc; and the border of the hue G corresponds to the ridge line RLg. Although not illustrated in FIG. 3A, the border of the hue Y is also present on the line drawn by connecting the apexes Y and K; the border of the hue R is also present on the line drawn by connecting the apexes W and R; the hue M is also present on the line drawn by connecting the apexes M and K; the border of the hue B is also present on the line drawn by connecting the apexes W and B; the border of the hue C is also present on the line drawn by connecting the apexes C and K; and the border of the hue G is also present on the line drawn by connecting the apexes W and G. By setting the six representative hues to borders between the hue regions 300 in this manner, the number of patches to be formed can be efficiently decreased. For this reason, six hues are preferably set to borders of the hue region 300; however, three to five hues may be set in order to make the arrangement of hue regions simpler.

At Step S204, the color conversion table generating apparatus 100 selects which of the hue regions 301 to 306 are inclusive hue regions, which are hue regions containing a target color Tt (Lt, at, bt). More specifically, the color conversion table generating apparatus 100 performs a process of selecting inclusive hue regions on the basis of the hue angle of the chromaticity coordinate of the target color Tt. If a hue angle is between the borders of the hues Y and R, for example, as illustrated in FIG. 6A, the hue region 301 defined by the borders of the hues Y to R may be selected as the inclusive hue region. In FIG. 6B, the hue region 301 is hatched by diagonal lines. If a hue angle is on the border of any hue, one of the two hue regions defined by the border of this hue may be selected as the inclusive hue region. If a plurality of target colors Tt are designated, the color conversion table generating apparatus 100 may select an inclusive hue region for each of the target colors Tt.

At Step S206, the color conversion table generating apparatus 100 selects a proximity hue region. The proximity hue region is one of the two hue regions which are adjacent to the inclusive hue region in a hue direction and which has a hue closer to that of the target color Tt. More specifically, the color conversion table generating apparatus 100 may determine a first angle difference and a second angle difference; the first angle difference is the difference between the hue angle of the chromaticity coordinates (at, bt) of the target color Tt and the angle of one of the borders of the hues adjacent to the inclusive hue region, and the second angle difference is the difference between the hue angle of the chromaticity coordinates (at, bt) of the target color Tt and the angle of the other of the borders of the hues adjacent to the inclusive hue region. Then, the color conversion table generating apparatus 100 may compare between the first and second angle differences and select the hue region corresponding to a smaller angle difference as the proximity hue region. As illustrated in FIG. 6A, for example, the hue region 302 and a hue region 306 are adjacent to the hue region 301 in a hue direction. In this case, the borders of the hues R and Y are present on both sides of the inclusive hue region 301, and the border of the hue R is closer to the hue angle of the target color Tt than the border of the hue Y. Therefore, the color conversion table generating apparatus 100 may select the hue region 302 as the proximity hue region. In FIG. 6B, the hue region 302 is hatched by diagonal lines. If the first and second angle differences are equal to each other, the color conversion table generating apparatus 100 may select any one of the adjacent hue regions. If the target color Tt is present on the border of any hue, the color conversion table generating apparatus 100 may select, as the proximity hue region, the one of the hue regions which are defined by the border of this hue and which has not been selected as the inclusive hue region. If a plurality of target colors Tt are designated, the color conversion table generating apparatus 100 may select the proximity hue region for each of the respective target colors Tt.

After having selected the proximity hue region, at Step S208, the color conversion table generating apparatus 100 acquires surface color coordinate values (Ls, as, bs) from each of the inclusive hue region selected at Step S204 and the proximity hue regions selected at Step S206. The surface color coordinate values (Ls, as, bs) indicate surface colors Ss at an n (integer of 2 or more) number of points on each ridge line. Then, the color conversion table generating apparatus 100 terminates the surface color setting process. As an example, if the hue regions 301 and 302 are selected as the inclusive hue region and the proximity hue region, respectively, the color conversion table generating apparatus 100 may acquire the surface color coordinate values (Ls, as, bs) of the surface colors Ss at an n (=3) number of points on each ridge line. In FIG. 7, the points of the surface colors Ss are each enclosed by a double circle. It should be noted that in FIG. 7, the color reproduction region GA0 made up of four colors is made larger in a lightness direction than in a chroma direction, for the purpose of helping an understanding. If the hue regions 301 and 302 are selected as the inclusive hue region and the proximity hue region, respectively, the color conversion table generating apparatus 100 sets three points of the surface colors Ss to each of the ridge lines RLy, RLr, and RLm, which correspond to the hues Y, R, and M, respectively. In this case, the surface color coordinate values indicating the surface colors Ss on the ridge lines RLy, RLr, and RLm may be border color coordinate values indicating the hues Y, R, and M, respectively. These border color coordinate values may include surface color coordinate values of the apexes W, Y, R, M, and K illustrated in FIG. 3A. Furthermore, the color conversion table generating apparatus 100 may set three points of the surface colors Ss to each of the remaining ridge lines of the regions between the hues Y to M. In the example of FIG. 7, the color conversion table generating apparatus 100 sets 23 points of the surface colors Ss, thereby acquiring 23 surface color coordinate values (Ls, as, bs) therefrom. If a plurality of target colors Tt are designated and three or more hue regions are selected, the number of surface colors Ss whose surface color coordinate values (Ls, as, bs) are to be acquired increases in proportion to the number of hue regions selected.

In this way, the color conversion table generating apparatus 100 selects surface colors Ss from which surface color coordinate values (Ls, as, bs) are to be acquired, in accordance with the target colors Tt. This can set ink amount upper limits UL with a smaller number of patches PA1.

After having performed the surface color setting process at Step S106 in FIG. 2, at Step S108, the color conversion table generating apparatus 100 sets the ink amount upper limit candidates 400 (see FIG. 8C) in accordance with various conditions, such as the types of the print substrate 290 and the inks. The ink amount upper limit candidates 400 may be candidates for the ink amount upper limits UL. In this case, the variable i may be used to differentiate the ink amount upper limit candidates 400.

Next, a concept of the ink ejection amount will be described with reference to FIG. 8A. FIG. 8A schematically illustrates an example of ink dots DT1 formed over the print substrate 290. The ink ejection amount, which is also referred to as the ink duty, indicates the amount per unit area of an ink ejected to a print substrate. Herein, a unit in which each ink dot DT1 is to be formed is defined as a pixel PX1; the number of pixels PX1 is an Npx (integer of two or more);

and the number of maximum-sized dots formed is an Ndt (integer of 0 or more). In this case, the ink ejection amount is defined as (Ndt/Npx)×100%. As an example, the Ndt is equal to the half of the Npx, as illustrated in the left part of FIG. 8A, the ink ejection amount may be 50%. When a plurality of colored inks are used, different colored dots are overlaid in the same pixels, in which case the ink ejection amount may exceed 100%. If an Npx number of dots (for example, Cyan dots) are formed in an Npx number of pixels and an Npx/4 number of dots (for example, Magenta dots) are further formed therein, for example, as illustrated in the right part of FIG. 8A, the ink ejection amount may be 125%. If dots that are smaller in size than the maximum-sized dots are formed, the color conversion table generating apparatus 100 may convert the number of smaller-sized dots into the number of maximum-sized dots on the basis of the weight proportions of their ink droplets, thereby calculating the ink ejection amount.

An increase in the ink ejection amount may enhance the color reproducibility of a printed image but be more likely to cause bleeding of ink dots and wrinkles of a print substrate. Therefore, the color conversion table generating apparatus 100 sets the ink amount upper limits UL, which are upper limits of the amounts per unit area of inks ejected to a print substrate, thereby controlling the ink ejection amount. In general, in order to suppress bleeding of ink dots and wrinkles of a print substrate under various print conditions, such as the types of print substrates and inks, for example, the color conversion table generating apparatus 100 preferably sets the ink amount upper limits UL to small values. In which case, however, the color reproducibility of a printed image may be lowered. In this embodiment, the color conversion table generating apparatus 100 can set the ink amount upper limits UL to small values, namely, can set the ink amount upper limit UL in a convenient manner but can achieve a high degree of color reproducibility of a printed image.

FIG. 8B schematically illustrates an example of ink amount upper limit candidate groups to be used to set the ink amount upper limit candidates 400. The ink amount upper limit candidate groups are stored in the storage device 114 in relation to individual print settings. As illustrated in FIG. 8C, for example, each ink amount upper limit candidate group includes the ink amount upper limit candidates 401, 402, 403, and so on. In this case, the variable z may be used to differentiate print settings, and an ink amount upper limit candidate group related to a print setting z may be referred to as an ink amount upper limit candidate group z. When the print setting z is set at Step S102 in FIG. 2, the color conversion table generating apparatus 100 acquires the ink amount upper limit candidate group z related to the print setting z from the storage device 114. Then, the color conversion table generating apparatus 100 sets the ink amount upper limit candidates 401, 402, 403, and so on included in the ink amount upper limit candidate group z, in order to generate the provisional profiles 501, 502, 503, and so on.

FIG. 8C schematically illustrates an example of ink amount upper limit candidates 401, 402, 403, and so on included in the ink amount upper limit candidate group z. It can be understood that, when an ink amount upper limit candidate group is changed, ink amount upper limit candidates included in this ink amount upper limit candidate group may also be changed. The table in FIG. 8C has columns "PRIMARY COLOR", "SECONDARY COLOR", and "TOTAL". The column "PRIMARY COLOR" indicates the upper limit of the used amount of a single ink used to create a primary color. As an example, if the column "PRIMARY COLOR" indicates "Q %", the ink amount upper limit of a single ink is Q %. In other words, a ratio of the maximum number Nmax of dots formed with a single ink to the number Npx of pixels (unit area) is Q % ((Nmax/Npx)×100%). The column "SECONDARY COLOR" indicates the upper limit of the amount of two inks used to create a secondary color. As an example, if the column "SECONDARY COLOR" indicates "Q %", the ink amount upper limit of two inks is Q %. In other words, a ratio of the maximum number Nmax of dots formed with two inks to the number Npx of pixels (unit area) is set to Q % ((Nmax/Npx)×100%). The column "TOTAL" indicates the upper limit of the amount of three or more inks used to create a tertiary color. As an example, if the column "TOTAL" indicates "Q %", the ink amount upper limit of three or more inks is Q %. In other words, a ratio of the maximum number Nmax of dots formed with three or more inks to the number Npx of pixels (unit area) is Q % ((Nmax/Npx)×100%). Referring to FIG. 8C, the ink amount upper limit of the ink amount upper limit candidate 401 is lower than that of ink amount upper limit candidate 402, and the ink amount upper limit of the ink amount upper limit candidate 402 is lower than that of ink amount upper limit candidate 403.

After having set the ink amount upper limit candidates (i) at Step S108 in FIG. 2, at Step S110, the color conversion table generating apparatus 100 generates provisional profiles 501, 502, 503, and so on for each of the ink amount upper limit candidates 401, 402, 403, and so on. In each of the provisional profiles 501, 502, 503, and so on, the correspondence relationships between coordinate values (Lp, ap, bp) in the Lab color space and output values (Cp, Mp, Yp, Kp) (used amounts of C, M, Y, and K) inks are defined. In this case, the variable p may be used to differentiate provisional profile generating patches PA3. In this case, the provisional profile generating patches PA3 are different from the patches PA1 (see FIG. 10) used to set the ink amount upper limits UL. At Step S110, provisional profiles (i) are generated in relation to and on the basis of each of the ink amount upper limit candidates (i).

Figure 9:
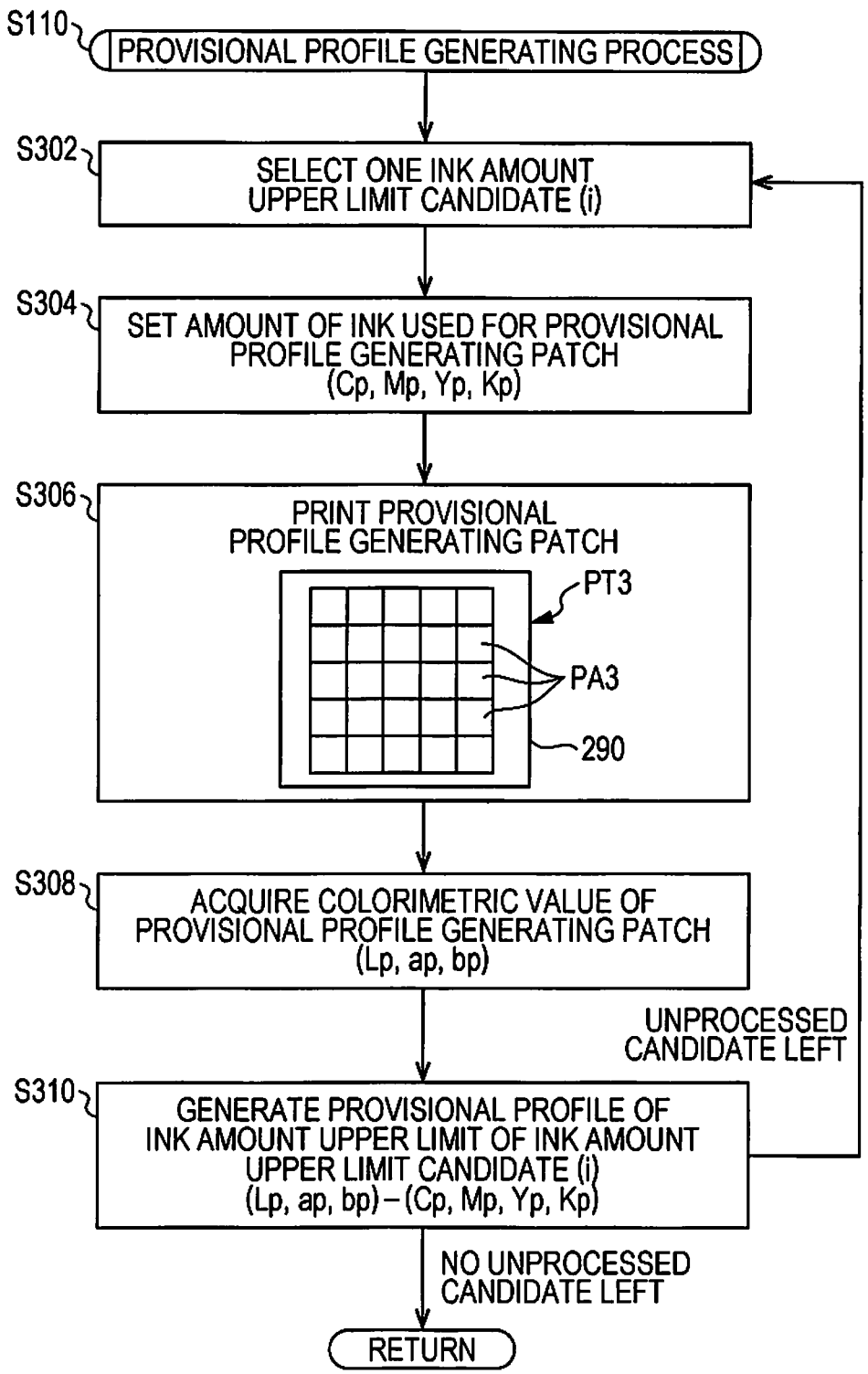
FIG. 9 is a flowchart of an example of a provisional profile generating process.

FIG. 9 is a flowchart of the provisional profile generating process performed at Step S110. When starting this process, at Step S302, the color conversion table generating apparatus 100 selects an ink amount upper limit candidate (i) from the ink amount upper limit candidates 401, 402, 403, and so on. At Step S304, the color conversion table generating apparatus 100 sets the amounts (output values Cp, Mp, Yp, Kp) of inks used for the provisional profile generating patches PA3, on the basis of the ink amount upper limit of the selected ink amount upper limit candidate (i). The provisional profile generating patches PA3 are used to generate the provisional profile (i) related to the selected ink amount upper limit candidate (i).

The amount of an ink used for a provisional profile generating patch PA3 may be set in the following manner, for example. First, a plurality of amounts of ink used for a "primary color" ink are set. For example, if the ink amount upper limit of the "primary color" is Q1% (0<Q1≤100) and the number of steps of the "primary color" is N1 (integer of 3 or more), the used amounts of the "primary color" ink may be set to {Q1×0/(N1−1)}%, {Q1×1/(N1−1)}%, . . . , {Q1×(N1−1)/(N1−1)}%. If the number of steps N1 is 11 and Q1 is 100%, the used amounts of the "primary color" ink are 0%, 10%, 20%, 100%. If the number of steps N1 is 11 and Q1 is 60%, the used amounts of the "primary color" ink are 0%, 6%, 12%, 60%. Then, these results are applied to the ink used amounts (output values Cp, Mp, Yp, Kp). As a result, $4^{N1}$ sets of ink used amounts ($4^{N1}$ sets of output values Cp, Mp, Yp, Kp) which take account of only the ink amount upper limit of the primary color are obtained. From these sets of output values, one that enables total amount of two inks to be equal to or less than the ink amount upper limit in the "SECONDARY COLOR" and total amount of three or more inks to be equal to or less than the ink amount upper limit in "TOTAL" is selected. In this way, the ink used amount (output value Cp, Mp, Yp, Kp) can be generated in accordance with the ink amount upper limit of the ink amount upper limit candidate (i).

After having generated the ink used amounts (output values Cp, Mp, Yp, Kp), at Step S306, the color conversion table generating apparatus 100 causes the printing apparatus 200 to create a printed matter PT3 on the basis of the output values (Cp, Mp, Yp, Kp). On the printed matter PT3, the provisional profile generating patches PA3 are formed in relation to the respective sets of ink used amounts. FIG. 9 schematically illustrates the printed matter PT3 in which the provisional profile generating patches PA3 are formed over the print substrate 290. At Step S308, the colorimetry device 117 measures the colors of the patches PA3. Then, the color conversion table generating apparatus 100 acquires the colorimetric values (Lp, ap, bp) of the patches PA3 from the colorimetry device 117. Each colorimetric value (Lp, ap, bp) indicates a color in the Lab color space. In other words, each colorimetric value (Lp, ap, bp) indicates a coordinate value in the Lab color space.

At Step S310, the color conversion table generating apparatus 100 relates colorimetric values (Lp, ap, bp) to ink used amounts (output values Cp, Mp, Yp, Kp) to generate the provisional profiles 500. Each provisional profile 500 may be an LUT in which the correspondence relationships between the coordinate values (Lp, ap, bp) in the Lab color space and the ink used amounts (output values (Cp, Mp, Yp, Kp)) are defined. Each provisional profile 500 generated in this manner may be a provisional profile (i) according to the ink amount upper limit of the ink amount upper limit candidate (i). If any of the ink amount upper limit candidates 401, 402, 403, and so on for which the provisional profile 500 is not yet generated is left, the color conversion table generating apparatus 100 repeats the processes at Steps S302 to S310. If no ink amount upper limit candidates for which the provisional profiles 500 are not yet generated are left, the color conversion table generating apparatus 100 terminates the provisional profile generating process.

After having generated the provisional profiles (i) at Step S110 in FIG. 2, at Step S112, the color conversion table generating apparatus 100 converts the plurality of surface color coordinate values (Ls, as, bs) set as Step S106 into output values (Cs, Ms, Ys, Ks) in accordance with the provisional profiles (i). In this case, the variable s may be used to differentiate the colors of surface color coordinate values. The output values (Cs, Ms, Ys, Ks) indicate ink used amounts to be used to form the patches PA1 (see FIG. 10). At Step S114, the color conversion table generating apparatus 100 causes the printing apparatus 200 to create printed matters PT1 (see FIG. 10) on each of which the patches PA1 are arranged in accordance with the output values (Cs, Ms, Ys, Ks). FIG. 10 schematically illustrates the printed matters PT1 which the patches PA1 are formed over the print substrates 290 in accordance with the ink amount upper limit candidates 401, 402, 403, and so on, respectively, corresponding to the provisional profiles (i). For example, the ink ejection amount for the patches PA1 which has been set in accordance with the provisional profile 501 corresponding to the ink amount upper limit candidate 401 may be related to the ink amount upper limit of the ink amount upper limit candidate 401. Likewise, the ink ejection amount for the patches PA1 which has been set in accordance with the provisional profile 502 corresponding to the ink amount upper limit candidate 402 may be related to the ink amount upper limit of the ink amount upper limit candidate 402. The ink ejection amount for the patches PA1 which has been set in accordance with the provisional profile 503 corresponding to the ink amount upper limit candidate 403 may be related to the ink amount upper limit of the ink amount upper limit candidate 403.

After having created the patches PA1, at Step S116, the colorimetry device 117 measures the colors of the patches PA1, and then the color conversion table generating apparatus 100 acquires colorimetric values (Lm, am, bm) of the patches PA1 from the colorimetry device 117. Each colorimetric value (Lm, am, bm) may indicate the color of a corresponding patch PA1 in the Lab color space. In this case, the variable m may be used to differentiate the patches PA1. More specifically, although the variable m corresponds to the variable s used to differentiate the colors of the surface color coordinate values, the variable m is used to differentiate between the colorimetric values and the surface color coordinate values (Ls, as, bs).

After having acquired the colorimetric values (Lm, am, bm), at Step S118, the color conversion table generating apparatus 100 determines whether the target color Tt is contained in the color reproduction region GA0 for each of the ink amount upper limit candidates (i), on the basis of the coordinate value (Lt, at, bt) of the target color Tt in the Lab color space and the plurality of colorimetric values (Lm, am, bm).

Figure 12:
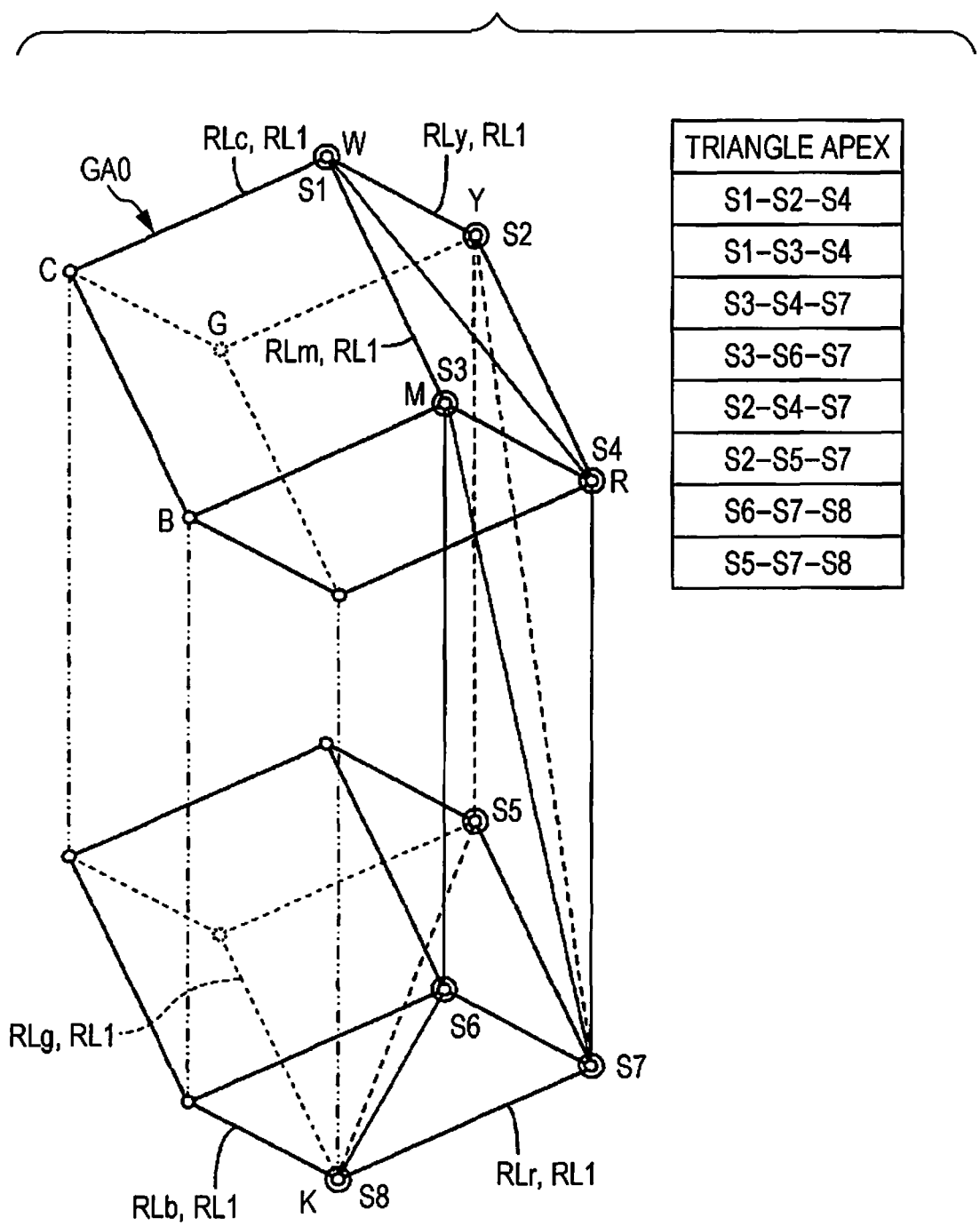
FIG. 12 is a schematic diagram illustrating an example of a process of defining triangles on the surfaces of a color reproduction region by drawing lines between colorimetric points in a predetermined color space.
Figure 13B:
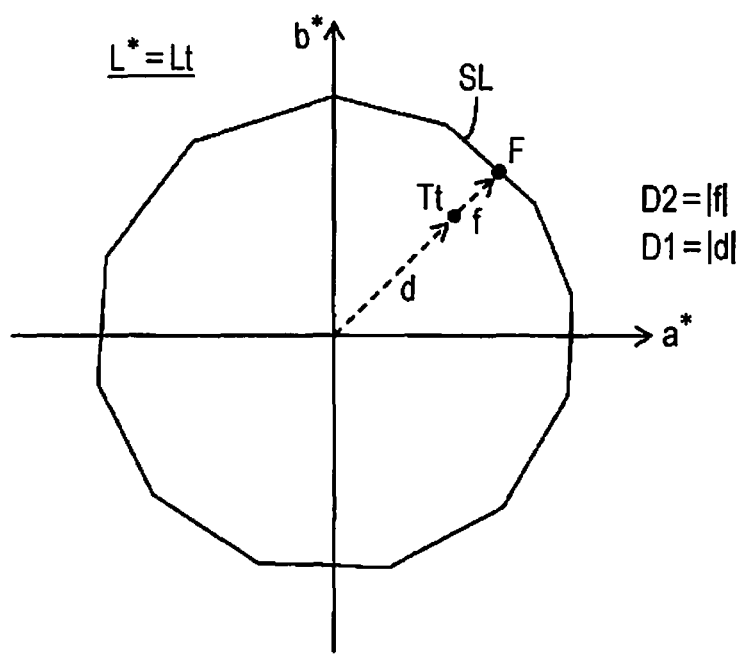
FIG. 13B is a schematic diagram illustrating an example of a process of determining whether a target color is contained within a color reproduction region in a chromaticity plane.

FIG. 11 is a flowchart of an example of the color reproduction determining process performed at Step S118. FIG. 12 schematically illustrates a process of defining triangles on the surfaces of the color reproduction region GA0 by drawing lines between colorimetric points at Step S404 in FIG. 11. FIG. 13A illustrates an example of a process of determining whether the target color Tt is contained within the color reproduction region GA0 in a plane along the L axis. FIG. 13B illustrates an example of a process of determining whether the target color Tt is contained within the color reproduction region GA0 in a chromaticity plane.

After having started the color reproduction determining process, at Step S402, the color conversion table generating apparatus 100 selects an ink amount upper limit candidate (i) from the ink amount upper limit candidates 401, 402, 403, and so on. At Step S404, by drawing lines between colorimetric points at which the colorimetric values (Lm, am, bm) are described in the Lab color space, triangles are defined on the surfaces of the color reproduction region GA0, for example, as illustrated FIG. 12. In the example of FIG. 12, a plurality of surface color coordinate values (Ls, as, bs) that indicate colorimetric points (surface colors Ss) are set to an n (=2) number of points on each ridge line of the color reproduction region GA0 made up of four colors or at the apexes of the surfaces of the color reproduction region GA0. The triangles are thereby defined. In the example of FIG. 12, the triangles are defined as follows. First, as illustrated in FIG. 6B, the hue region 301 defined by the borders of the hues Y and R and the hue region 302 defined by the borders of the hues R and M are selected. Then, the surface colors Ss from which the surface color coordinate values (Ls, as, bs) are to be acquired are set to apexes S1 to S8 on the surfaces of the color reproduction region GA0. More specifically, in the example of FIG. 12, the triangles are defined by drawing lines between apexes S1, S2, and S4, between apexes S1, S3, and S4, between apexes S3, S4, and S7, between apexes S3, S6, and S7, between apexes S2, S4, and S7, between apexes S2, S5, and S7, between apexes S6, S7, and S8, and between apexes S5, S7, and S8. These triangles are handled as the surfaces of the color reproduction region GA0 and used to determine whether the target color Tt is contained in the color reproduction region GA0.

A method of defining triangles by drawing lines between colorimetric points on the surfaces of a color reproduction region is not limited to the above method. Alternatively, a method using 3D Delaunay triangulation may be employed.

After having defined the triangles on the surfaces of the color reproduction region GA0, at Step S406, the color conversion table generating apparatus 100 determines a vector d that extends from the lightness Lt on the L axis to the lightness Lt of the target color Tt (Lt, at, bt), for example, as illustrated in FIGS. 13A and 13B. In this case, the vector d may contain a component (0, at, bt) in the Lab color space.

At Step S408, the color conversion table generating apparatus 100 determines which triangle intersects the vector d. More specifically, for example, the color conversion table generating apparatus 100 may identify a plurality of triangles containing the lightness Lt from the triangles defined at Step S404. Then, the color conversion table generating apparatus 100 may determine the triangle that contains the hue defined by the chromaticity coordinate (at, bt) of the target color Tt from the determined triangles. However, a method of determining the triangle that intersects the vector d is not limiting, and any other methods may be employed.

At Step S410, the color conversion table generating apparatus 100 determines an intersection point F at which the triangle determined at Step S408 intersects the vector d. Then, the color conversion table generating apparatus 100 determines a vector f that extends from the lightness Lt on the L axis to the intersection point F. As illustrated in FIG. 13B, for example, the color conversion table generating apparatus 100 may determine a segment SL corresponding to the triangle defined at Step S408 in a chromaticity plane of the lightness Lt. Then, the color conversion table generating apparatus 100 may designate a hue point on the segment SL which is defined by the chromaticity coordinate (at, bt) of the target color Tt at the intersection F. The color conversion table generating apparatus 100 may derive a component (0, af, bf) from the vector f extending from the L axis to the intersection F.

At Step S412, the processing is branched into two steps. The color conversion table generating apparatus 100 determines to which step it proceeds, depending on the lengths of the vector d (D1=|d|) and the vector f (D2=|f|). More specifically, the color conversion table generating apparatus 100 compares the lengths of the vector d (D1=|d|) and the vector f (D2=|f|). In this case, D1 may be expressed as $(at^2+bt^2)^{1/2}$, and D2 may be expressed $(af^2+bf^2)^{1/2}$. The length D1 of the vector d indicates the color difference between the L axis and the target color Tt, and the length D2 of the vector f indicates the color difference between the L axis and the intersection point F. If D1 is equal to or less than D2 (|d|≤|f|) (YES at Step S412), at Step S414, the color conversion table generating apparatus 100 determines that the target color Tt is contained in the color reproduction region GA0. In the example of FIG. 13B, the length D2 of the vector f extending from the L axis to the intersection F is greater than the length D1 of the vector d. Therefore, the color conversion table generating apparatus 100 determines that the target color Tt is contained in the color reproduction region GA0. If D1 is more than D2 (|d|>|f|) (NO at Step S412), at Step S416, the color conversion table generating apparatus 100 determines that the target color Tt is not contained in the color reproduction region GA0. In the example of FIG. 13A, the color conversion table generating apparatus 100 determines that a target color Tt' (Lt', at', bt') is not contained in the color reproduction region GA0, because a length D1 of a vector d is greater than a length D2 of a vector f extending from the L axis to an intersection F. In short, at Steps S412 to S416, the color conversion table generating apparatus 100 determines whether the distance D1 between the lightness Lt on the L axis and the lightness Lt of the target color Tt in the Lab color space is the same as or shorter than the distance D2 between the L axis and the surface of the color reproduction region GA0.

If all of the ink amount upper limit candidates 401, 402, 403, and so on have not yet been processed at Steps S402 to S416, the color conversion table generating apparatus 100 performs the processes at Steps S402 to S416 again. If all of the ink amount upper limit candidates have already been processed at Steps S402 to S416, the color conversion table generating apparatus 100 terminates the provisional profile generating process. As a result, there are cases where the target color Tt is contained in the color reproduction region GA0 for one ink amount upper limit candidate but is not contained therein for another ink amount upper limit candidate.

After having performed the color reproduction determining process at Step S118, at Step S120, the color conversion table generating apparatus 100 outputs the color reproduction determination information 700, for example, as illustrated in FIG. 14A. The color reproduction determination information 700 indicates whether the target color T is contained in the color reproduction region GA0 for each of the ink amount upper limit candidates 401, 402, 403, and so on.

FIG. 14A schematically illustrates a determination result output screen 610, which is an example of the color reproduction determination information 700 displayed in display device 115. In the example of the determination result output screen 610 of the color conversion table generating apparatus 100, candidates 611, 612, 613 and so on corresponding to the ink amount upper limit candidates 401, 402, 403, and so on, respectively, are listed in recommended order. The determination result output screen 610 indicates whether the target color Tt is contained in the color reproduction region GA0 for each of the candidates 611, 612, 613, and so on. For example, suppose among the ink amount upper limit candidates 400, a plurality of color reproduction intra-regional candidates, each of which is determined to be a candidate for which the target color Tt is contained in the color reproduction region GA0, are present. In the example of FIG. 14A, the candidates 612 and 613 are each determined to be a color reproduction intra-regional candidate, and the candidate 611 is determined to be the color reproduction extra-region candidate, which is a candidate for which the target color Tt is not contained in the color reproduction region GA0. In this case, for example, the color reproduction intra-regional candidate that has a lower ink amount upper limit, the remaining color reproduction intra-regional candidate that has a larger ink amount upper limit, and the color reproduction extra-region candidate may be recommended in this order. In the determination result output screen 610, thus, the color reproduction intra-regional candidate 612 is recommended more strongly than any of the candidates 611 and 613. If only one of a plurality of ink amount upper limit candidates 400 is determined to be a color reproduction intra-regional candidate, this ink amount upper limit candidates 400 may be displayed on the determination result output screen 610 as the most highly recommended candidate.

The color reproduction determination information 700 output in this manner is not limited to the determination result output screen 610 illustrated in FIG. 14A. As an alternative example, the color reproduction intra-regional candidate 613 that has a higher ink amount upper limit may be non-displayed, like a determination result output screen 610 illustrated in FIG. 14B. In other words, only the color reproduction intra-regional candidate 612 that has a lower ink amount upper limit may be displayed and recommended. In this case, the candidate recommended next may be displayed in response to a user's operation of the input device 116. As illustrated in FIGS. 14A and 14B, the color conversion table generating apparatus 100 outputs information that recommends the one of a plurality of color reproduction intra-regional candidates which has the lowest ink amount upper limit to the determination result output screen 610, and then displays the information thereon. This can perform a printing operation using a color conversion table with a minimal consumption of inks.

In the color reproduction determining process of FIG. 11, the color conversion table generating apparatus 100 may skip the process at Step S402 in which an ink amount upper limit candidate (i) is selected. More specifically, the color conversion table generating apparatus 100 may process any ink amount upper limit candidate (i) at Steps S118 to S120 in FIG. 2 and, as necessary, may select another ink amount upper limit candidate (i) and process this ink amount upper limit candidate (i) at Steps S118 to S120. In this case, the color conversion table generating apparatus 100 may determine whether the target color Tt is contained in the color reproduction region GA0 for a single ink amount upper limit candidate (i), and then may output the color reproduction determination information 700 on the basis of the determination result. FIG. 15A schematically illustrates a determination result output screen 620, which is another example of the color reproduction determination information 700. The determination result output screen 620 may be displayed in the display device 115 when the color reproduction determining process is subjected to only the ink amount upper limit candidate 401 (an example of candidate 1) illustrated in FIG. 8C. If it is determined that the target color Tt is not contained in the color reproduction region GA0 for the ink amount upper limit candidate 401, the color conversion table generating apparatus 100 may display this determination result on the determination result output screen 620 and may further display a color reproduction extra-region candidate 621 thereon. In addition, the color conversion table generating apparatus 100 may display information 622 that indicates the ink amount upper limit candidate 402 (an example of candidate 2) that has the second highest ink amount upper limit on the determination result output screen 620.

When the color conversion table generating apparatus 100 accepts a request of displaying the color reproduction determination information 700 that indicates the next candidate through the input device 116 while displaying the determination result output screen 620 as illustrated in FIG. 15A, the color conversion table generating apparatus 100 processes the ink amount upper limit candidate 402 at Steps S118 to S120. When it is determined that the target color Tt is contained in the color reproduction region GA0 for the ink amount upper limit candidate 402, the color conversion table generating apparatus 100 displays this determination result on the determination result output screen 620 and further displays a color reproduction intra-regional candidate 622' thereon. As illustrated in FIGS. 15A and 15B, the color conversion table generating apparatus 100 outputs information regarding candidate 2 to the determination result output screen 620 when determining that the target color Tt is not contained in the color reproduction region GA0 for candidate 1, and then displays this information thereon. This can set ink amount upper limits in a convenient manner.

After having displayed the color reproduction determination information 700, at Step S122 in FIG. 2, the color conversion table generating apparatus 100 determines the ink amount upper limit UL. When receiving an operation of accepting the color reproduction intra-regional candidate 612 most strongly recommended by the determination result output screen 610 as illustrated in FIG. 14A or 14B through the input device 116, for example, the color conversion table generating apparatus 100 designates the ink amount upper limit of the ink amount upper limit candidate 402 corresponding to the color reproduction intra-regional candidate 612, as the ink amount upper limit UL to be used to generate the color conversion table 580 illustrated in FIG. 16. This ink amount upper limit UL may be information used to determine the output profile 500 that indicates the color reproduction property of the printing apparatus 200 or other output device. Since the provisional profile 502 corresponding to the ink amount upper limit candidate 402 has already been generated, this provisional profile 502 is designated as the output profile 500. If receiving an operation of accepting the color reproduction intra-regional candidate 613 second-most recommended by the determination result output screen 610 as illustrated in FIG. 14A through the input device 116, for example, the color conversion table generating apparatus 100 designates the ink amount upper limit of the ink amount upper limit candidate 403 corresponding to the color reproduction intra-regional candidate 613, as the ink amount upper limit UL to be used to generate the color conversion table 580.

After having determined the ink amount upper limits UL, at Step S124, the color conversion table generating apparatus 100 generates the color conversion table 580 as illustrated in FIG. 16 on the basis of the ink amount upper limits UL. Then, the color conversion table generating apparatus 100 terminates the color conversion table generating process. The color conversion table 580 illustrated in FIG. 16 may be generated using the above output profile 500 and the input profile 560 that indicates the color property of an input device such as an external input device. The input profile 560 illustrated in FIG. 16 may be information that indicates the correspondence relationship between the coordinate values (Rj, Gj, Bj) in the RGB color space (input color space CS1) which depend on the input device and the coordinate values (Lj, aj, bj) in the Lab color space. Each coordinate value (Rj, Gj, Bj) may represent the amounts of R, G, and B colors. The output profile 500 illustrated in FIG. 16 may be information that indicates the correspondence relationship between the coordinate values (Cj, Mj, Yj, Kj) in the CMYK color space (output color space CS2) which depend on the output device and the coordinate values (Lj, aj, bj) in the Lab color space. Each coordinate value (Cj, Mj, Yj, Kj) represents the used amount of an ink which is set so as to exceed the ink amount upper limit UL. In this case, the variable j may be used to differentiate the grid points GD0 corresponding to the coordinate values in an input color space CS1. The color conversion table generating apparatus 100 can acquire the coordinate values (Lj, aj, bj) in the Lab color space which correspond to input coordinate values (Rj, Gj, Bj) that indicate the locations of the grid points GD0, from the input profile 560. In addition, the color conversion table generating apparatus 100 can acquire the coordinate values (Cj, Mj, Yj, Kj) in the output color space CS2 which correspond to the coordinate values (Lj, aj, bj) in the Lab color space, from the output profile 500. As illustrated in FIG. 16, the color conversion table generating apparatus 100 can relate the input coordinate values (Rj, Gj, Bj) to the output coordinate values (Cj, Mj, Yj, Kj), thereby generating the color conversion table 580 in which the correspondence relationship is defined at each grid point GD0. In this case, the ink ejection amount may be set so as not to exceed the ink amount upper limit UL at each output coordinate value (Cj, Mj, Yj, Kj).

The color conversion table 580 generated in this manner may be incorporated into an unillustrated printer driver, for example. This printer driver implements a print controller, and this print controller refers to the color conversion table 580, which generates output data that indicates the coordinate values (Cq, Mq, Yq, Kq) in the output color space CS2 from print data that indicates the coordinate values (Rq, Gq, Bq) in the input color space CS1. The color conversion table generating apparatus 100 transmits this output data to the printing apparatus 200. When receiving the output data, the printing apparatus 200 prints the image IM2 over the print substrate 290 on the basis of the output data, thereby creating the printed matter PT2. In this case, the printed image IM2 may be created such that the ink ejection amounts do not exceed the corresponding ink amount upper limits UL.

As described above, the color conversion table generating apparatus 100 outputs the color reproduction determination information 700 that indicates whether the target color Tt is contained in the color reproduction region GA0 for each ink amount upper limit candidate 400. This enables a user to recognize whether it is possible to reproduce a desired color by selecting each ink amount upper limit candidate 400. Consequently, the color conversion table generating apparatus 100 in this embodiment can set ink amount upper limits in a convenient manner, with a high degree of color reproducibility achieved. Furthermore, the color conversion table generating apparatus 100 can also set ink amount upper limits with a small number of patches PA1 formed.

(4) MODIFICATION

Various modifications of the invention are possible. For example, the types of inks for which the ink amount upper limits UL are to be set are not limited to C, M, Y, and K inks and may further include: an Lc (light cyan) ink that has a lower concentration than a C ink; an Lm (light magenta) that has a lower concentration than an M ink; a Dy (dark yellow) ink that has a higher concentration than a Y ink; an Lk (light black) ink that has a lower concentration than an Or (orange), Gr (green), and a K ink; and some unpigmented materials to be used to improve an image quality. If one or more of C, M, Y, and K inks are not used, the technology is still applicable. The input color space is not limited to be a RGB color space and may be a CMY color space or a CMYK color space, for example.

The foregoing processes may be modified as appropriate. For example, the order in which these processes are performed may be changed. More specifically, in the color conversion table generating process in FIG. 2, the color conversion table generating apparatus 100 may perform the processes at Steps S108 and S110 before Step S104. In other words, the color conversion table generating apparatus 100 may set the ink amount upper limit candidates (i) and generate the provisional profiles (i) before accepting the designation of the target colors Tt. Moreover, the color conversion table generating apparatus 100 may display the determination result output screen 610 illustrated in FIG. 14A or 14B or the determination result output screen 620 illustrated in FIG. 15B at Step S120 and then may automatically set the ink amount upper limits UL at Step S122. In this case, the color conversion table generating apparatus 100 may output information that indicates the one of a plurality of color reproduction intra-regional candidates which has the lowest ink amount upper limit. Then, the color conversion table generating apparatus 100 may automatically set this lowest ink amount upper limit of the color reproduction intra-regional candidate to the ink amount upper limit UL to be used to determine the output profile.

(5) CONCLUSION

As described above, various aspects of the invention can provide a technique for setting ink amount upper limits in a convenient manner with a high degree of color reproducibility achieved. It should be understood that only technical components in each independent claim can provide fundamental functions and effects as described above. Furthermore, the components described above may be substituted or arranged in different manners, or combined with some components disclosed in the related art. Obviously, such configurations should also fall within the scope of the invention.

This application claims priority under 35 U.S.C. § 119 to Japanese Patent Application No. 2016-155400, filed Aug. 8, 2016. The entire disclosure of Japanese Patent Application No. 2016-155400 is hereby incorporated herein by reference.

What is claimed is:

1. A non-transitory computer readable medium for storing an ink amount upper limit setting program that sets an ink amount upper limit of a plurality of inks as a whole to be used by an output device, the ink amount upper limit being an upper limit of the amount per unit area of the inks as a whole that the output device is permitted to discharge, the ink amount upper limit setting program that is fulfilled by a computer comprising:

a target color designating section that accepts designation of at least one target color for which the ink amount upper limit is to be set;

a correspondence relationship defining section that defines a correspondence relationship between coordinate values in a predetermined color space and output values, on the basis of ink amount upper limit candidates, the output values indicating the used amounts of the respective inks, the ink amount upper limit candidates being candidates for the ink amount upper limit of the plurality of inks as a whole;

a patch controller that converts surface color coordinate values into the output values on the basis of the correspondence relationship and causes the output device to form patches in accordance with the output values, the surface color coordinate values indicating colors of surfaces of a color reproduction region, the color reproduction region being a range of colors in the predetermined color space, the colors to be reproduced by the output device;

a colorimetric value acquiring section that acquires colorimetric values of the formed patches, the colorimetric values indicating colors in the predetermined color space; and a color reproduction determination output section that outputs color reproduction determination information on the basis of a positional relationship between the surface color coordinate values in the predetermined color space and the colorimetric values, the color reproduction determination information indicating whether the target color is contained in the color reproduction region for each of the ink amount upper limit candidates, wherein the ink amount upper limit candidates include a plurality of candidates having different ink amount upper limits, the color reproduction determination output section determines whether the target color is contained in the color reproduction region for each of two or more of the plurality of candidates, and when the color reproduction determination output section determines that a plurality of color reproduction intra-regional candidates are present, the color reproduction determination output section outputs information that recommends one of the plurality of color reproduction intra-regional candidates which has the lowest ink amount upper limit, each of the color reproduction intra-regional candidates being a candidate for which the target color is contained in the color reproduction region.

2. A non-transitory computer readable medium for storing an ink amount upper limit setting program that sets an ink amount upper limit of a plurality of inks as a whole to be used by an output device, the ink amount upper limit being an upper limit of the amount per unit area of the inks as a whole that the output device is permitted to discharge, the ink amount upper limit setting program that is fulfilled by a computer comprising:

a target color designating section that accepts designation of at least one target color for which the ink amount upper limit is to be set;

a correspondence relationship defining section that defines a correspondence relationship between coordinate values in a predetermined color space and output values, on the basis of ink amount upper limit candidates, the output values indicating the used amounts of the respective inks, the ink amount upper limit candidates being candidates for the ink amount upper limit of the plurality of inks as a whole;

a patch controller that converts surface color coordinate values into the output values on the basis of the correspondence relationship and causes the output device to form patches in accordance with the output values, the surface color coordinate values indicating colors of surfaces of a color reproduction region, the color reproduction region being a range of colors in the predetermined color space, the colors to be reproduced by the output device;

a colorimetric value acquiring section that acquires colorimetric values of the formed patches, the colorimetric values indicating colors in the predetermined color space; and a color reproduction determination output section that outputs color reproduction determination information on the basis of a positional relationship between the surface color coordinate values in the predetermined color space and the colorimetric values, the color reproduction determination information indicating whether the target color is contained in the color reproduction region for each of the ink amount upper limit candidates, wherein the ink amount upper limit candidates include at least a first candidate and a second candidate that have different ink amount upper limits, the color reproduction determination output section determines whether the target color is contained in the color reproduction region for the first candidate, and when the color reproduction determination output section determines that the target color is not contained in the color reproduction region for the first candidate, the color reproduction determination output section outputs information that indicates the second candidate.

3. The non-transitory computer readable medium for storing the ink amount upper limit setting program according to claim 2, further comprising a surface color setting section that sets the plurality of surface color coordinate values on the basis of the target color, wherein the patch controller causes the output device to form the plurality of patches on the basis of the plurality of surface color coordinate values, the colorimetric value acquiring section acquires the colorimetric values of the plurality of formed patches, and the color reproduction determination output section outputs the color reproduction determination information on the basis of coordinate values of the target color in the predetermined color space and the plurality of colorimetric values.

4. The non-transitory computer readable medium for storing the ink amount upper limit setting program according to claim 3, wherein the surface color setting section divides the predetermined color space into a plurality of hue regions having different hue ranges, and sets the plurality of surface color coordinate values that indicate colors of surfaces of one or more of the hue regions which at least include a hue region containing the target color.

5. The non-transitory computer readable medium for storing the ink amount upper limit setting program according to claim 4, wherein the plurality of hue regions are separated from one another by borders of three or more hues selected from yellow, red, magenta, blue, cyan, and green, the surface color setting section sets a plurality of surface color coordinate values that indicate surface colors of a first hue region and a second hue region, the first hue region containing the target color, the second hue region being one of two hue regions which are adjacent to the first hue region in a hue direction and which has a hue closer to a hue of the target color, and the plurality of surface color coordinate values contain a plurality of border color coordinate values that indicate the hues of the borders.

6. The non-transitory computer readable medium for storing the ink amount upper limit setting program according to claim 3, wherein the surface color setting section sets at least the plurality of surface color coordinate values to apexes of the surfaces of the color reproduction region.

7. The non-transitory computer readable medium for storing the ink amount upper limit setting program according to claim 2, wherein the predetermined color space is a color space defined by an achromatic color axis and two chroma axes that intersect each other, the color reproduction determination output section determines whether a first distance is the same as or shorter than a second distance, the first distance being a distance between lightness on the achromatic color axis and lightness of the target color in the predetermined color space, the second distance being a distance between the lightness on the achromatic color axis and lightness on a surface of the color reproduction region in the predetermined color space, and when the color reproduction determination output section determines that the first distance is the same as or shorter than the second distance, the color reproduction determination output section outputs the color reproduction determination information that indicates the target color is contained in the color reproduction region.

8. An ink amount upper limit setting method of setting an ink amount upper limit of a plurality of inks as a whole to be used by an output device, the ink amount upper limit being an upper limit of the amount per unit area of the inks as a whole that the output device is permitted to discharge, the ink amount upper limit setting method comprising:

accepting designation of at least one target color for which the ink amount upper limit is to be set;

defining a correspondence relationship between coordinate values in a predetermined color space and output values, on the basis of ink amount upper limit candidates, the output values indicating the used amounts of the respective inks, the ink amount upper limit candidates being candidates for the ink amount upper limit of the plurality of inks as a whole, the ink amount upper limit candidates including at least an ink amount upper limit of a used amount of a primary color and an ink amount upper limit of a used amount of a secondary color;

converting surface color coordinate values into the output values on the basis of the correspondence relationship and causes the output device to form patches in accordance with the output values, the surface color coordinate values indicating colors of surfaces of a color reproduction region, the color reproduction region being a range of colors in the predetermined color space, the colors to be reproduced by the output device;

acquiring colorimetric values of the formed patches, the colorimetric values indicating colors in the predetermined color space; and outputting color reproduction determination information on the basis of a positional relationship between the surface color coordinate values in the predetermined color space and the colorimetric values for the respective target color, the color reproduction determination information indicating whether the respective target color is contained in the color reproduction region for each of the ink amount upper limit candidates, wherein the ink amount upper limit candidates include at least a first candidate and a second candidate that have different ink amount upper limits, the outputting step determines whether the respective target color is contained in the color reproduction region for the first candidate of each of the ink amount upper limit candidates, and when it is determined that the respective target color is not contained in the color reproduction region for the first candidate of each of the ink amount upper limit candidates, the outputting step outputs information that indicates the second candidate of each of the ink amount upper limit candidates.

* * * * *